United States Patent [19]
Fell et al.

[11] Patent Number: 5,136,831
[45] Date of Patent: Aug. 11, 1992

[54] CONTINUOUS ROUND BALER AND METHOD

[75] Inventors: Ferol S. Fell, Newton; J. Dale Anderson, Canton; Howard J. Ratzlaff, Hesston; H. Keith Garrison, Newton, all of Kans.

[73] Assignee: Hay & Forage Industries, Hesston, Kans.

[21] Appl. No.: 639,257

[22] Filed: Jan. 9, 1991

Related U.S. Application Data

[63] Continuation-in-part of Ser. No. 440,407, Apr. 17, 1989, abandoned, which is a continuation of Ser. No. 282,846, Dec. 9, 1988, abandoned, which is a continuation of Ser. No. 103,057, Sep. 30, 1987, abandoned, which is a continuation-in-part of Ser. No. 892,996, Aug. 4, 1986, abandoned.

[51] Int. Cl.$^5$ .......................... A01F 15/07; B30B 5/05
[52] U.S. Cl. ......................................... 56/341; 100/88
[58] Field of Search .................. 56/341, 343, 342; 100/88

[56] References Cited

U.S. PATENT DOCUMENTS

| | | | |
|---|---|---|---|
| 4,009,559 | 3/1977 | Mast | 56/343 |
| 4,273,036 | 6/1981 | Kopaska | 56/341 |
| 4,499,714 | 2/1985 | Hollmann | 100/88 |
| 4,510,861 | 4/1985 | Campbell et al. | 56/341 |
| 4,514,969 | 5/1985 | Moosbrucker et al. | 100/88 |
| 4,534,285 | 8/1985 | Underhill | 56/341 |
| 4,580,398 | 4/1986 | Bruer et al. | 56/341 |
| 4,597,254 | 7/1986 | Bowden, Jr. | 56/341 |
| 4,625,502 | 12/1986 | Gerhardt et al. | 56/341 |
| 4,667,592 | 5/1987 | Pentith et al. | 56/341 |

FOREIGN PATENT DOCUMENTS

| | | | |
|---|---|---|---|
| 64117 | 11/1982 | European Pat. Off. | 56/341 |
| 35114 | 9/1987 | European Pat. Off. | 56/341 |
| 830151 | 3/1960 | United Kingdom | 56/341 |

*Primary Examiner*—Terry Lee Melius
*Attorney, Agent, or Firm*—Hovey, Williams, Timmons & Collins

[57] ABSTRACT

The baler has a "vertical" bale starting chamber in which the upward moving rear belts and the downwardly moving front belts cooperate to tumble and roll incoming material into a bale. When the bale reaches full size in the expanded chamber, the bale is lifted while still in its chamber to a wrapping station where it continues to spin as a binding wrapper is applied. During the lifting of the finished bale and subsequent application of the wrapper, fresh material entering the continuously moving baler is confined beneath the finished bale in a new starting chamber, whereupon the cycle is repeated. As the new bale grows, a discharge ramp becomes formed by certain stretches of the belts and rollers to gravitationally discharge the wrapped bale from the baler without stopping advancement of the machine.

31 Claims, 21 Drawing Sheets

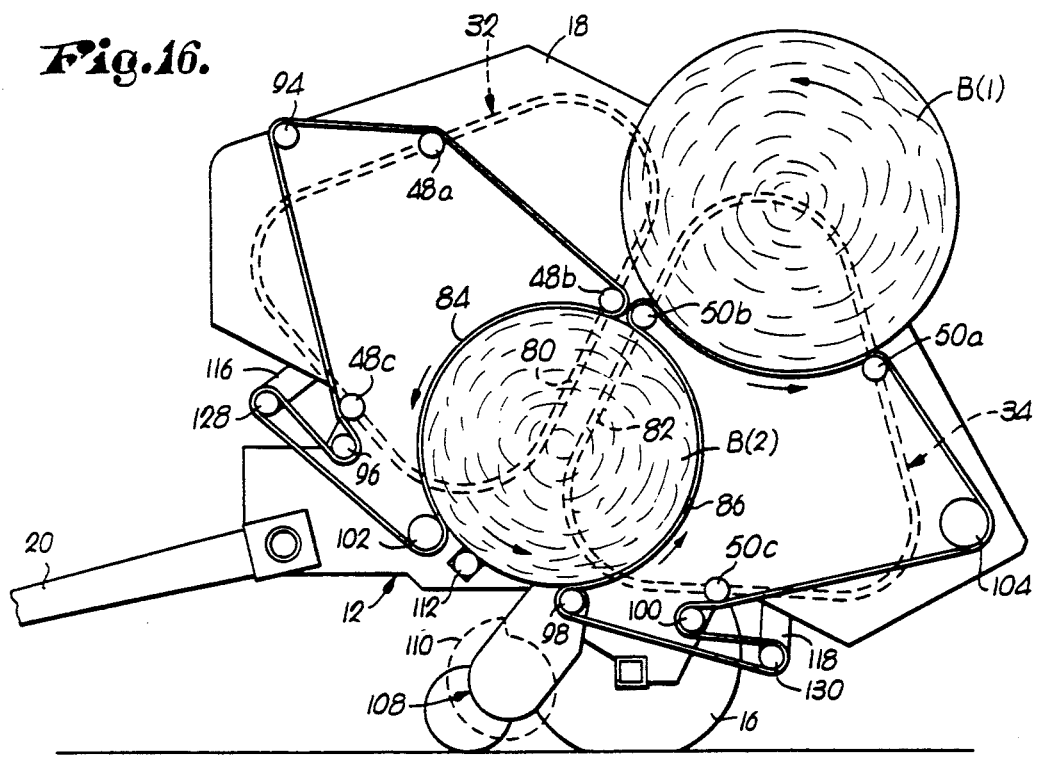

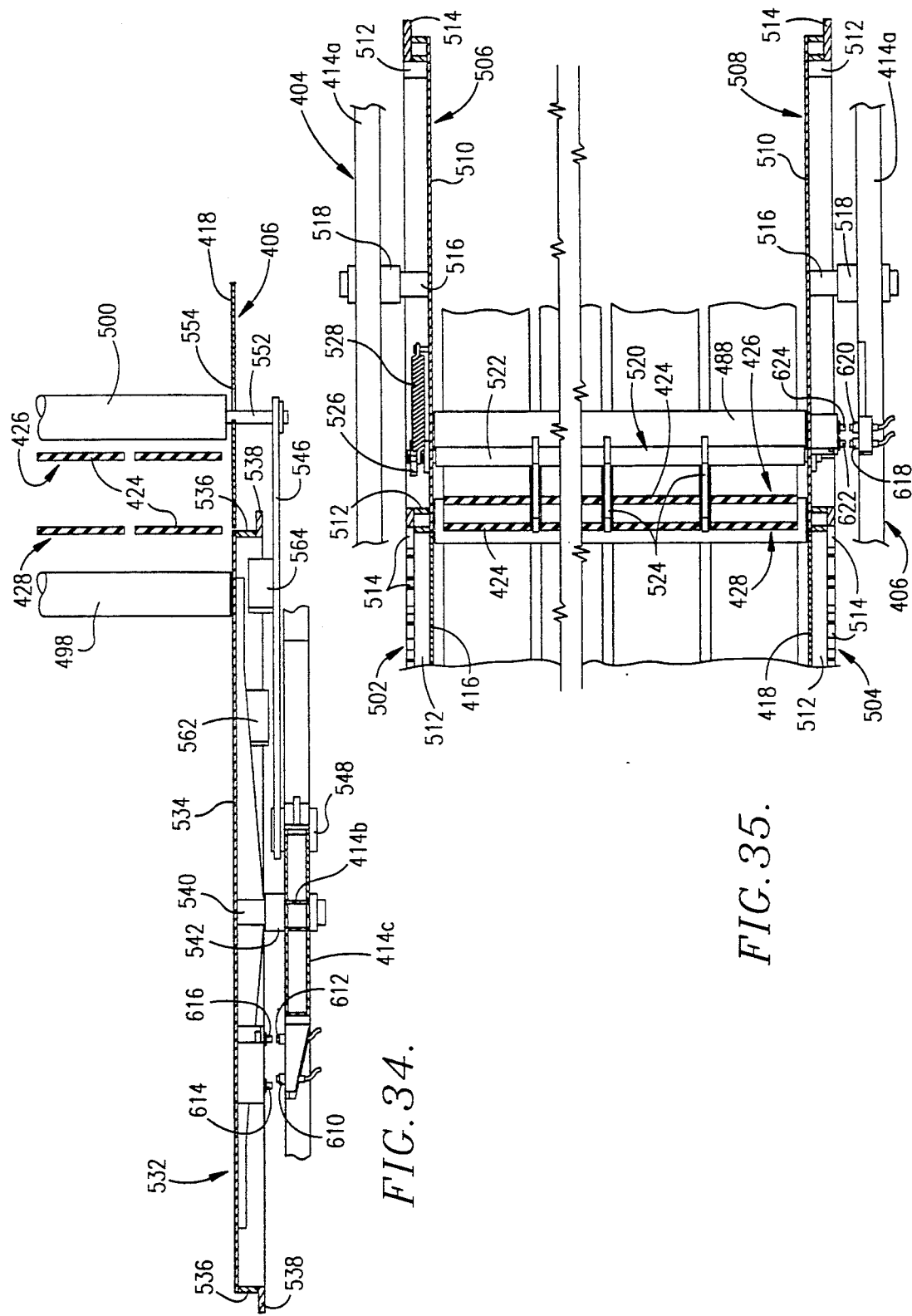

CONTINUOUS ROUND BALER AND METHOD

RELATED APPLICATIONS

This application is a continuation-in-part of prior co-pending application Ser. No. 07/440,407 filed Nov. 17, 1989, which is a continuation of Ser. No. 07/282,846 filed Dec. 9, 1988, which is a continuation of Ser. No. 07/103,057 filed Sep. 30, 1987, which is a continuation-in-part of Ser. No. 06/892,996 filed Aug. 4, 1986, all abandoned.

TECHNICAL FIELD

This invention generally relates to crop harvesting techniques and, more particularly, concerns a baler and method for making large round bales of crop material on a continuous basis, i.e., by continuing to move the baler forwardly across the field picking up and forming crop material into a new bale as a completed bale is being wrapped with twine and discharged onto the field.

BACKGROUND

Large round bales have become an exceedingly popular package in which to store a variety of crop materials, ranging from alfalfa to corn stalks. The large cylindrical configuration and generally uniform density of the bales enhance their weathering characteristics, allowing the bales to remain in the field until needed. Additionally, the bales concentrate large quantities of crop material in individual packages, reducing the time required to gather and transport a given amount of crop material when needed. Further, other than a tractor operator, no manual labor is required to gather and transport the bales from the field. In sum, the benefits of large round bales are consistent with the continuing trend toward highly mechanized agricultural operations.

Conventional large round balers require discharge of a completed bale before formation of a new bale is started. Such requirement consumes a significant amount of the total baling time.

Several proposed designs exist in the prior art of round balers which appear to be capable of continuous operation. See, for example, U.S. Pat. Nos. 4,035,999 and 4,499,714. However, neither of these proposed designs has achieved commercial acceptance. Apparently, the projected increases in productivity expected to be gained using balers of these designs were outweighed by the complexity, costs, and other unresolved problems associated therewith.

SUMMARY OF THE PRESENT INVENTION

The present invention provides a large round baler and baling method designed to achieve the heretofore elusive goal of continuous baling operation. Furthermore, the present invention is intended to capitalize on the heretofore highly successful "vertical chamber" round baling concepts pioneered in U.S. Pat. Nos. 4,321,787; 4,386,493; and 4,182,101 by providing a way of utilizing such vertical chamber concepts in a continuous round baler.

Pursuant to these objectives, the present invention contemplates a continuous baler which, preferably, starts each bale in a "vertical chamber" of the type illustrated in the '787, '493 and '101 patents. The bale forming proceeds in the usual way until the bale reaches full size, whereupon while still contained in its chamber, it is lifted into a raised position as fresh material continues to enter the baler beneath the rising bale. As the finished bale rises, a new vertical starting chamber is created beneath the rising bale to capture the incoming materials and to commence forming the next bale. If desired, after the upper bale has been raised sufficiently to allow formation of the new starting chamber there beneath, the upper bale may remain in the baler and continue turning while a suitable strapping material such as binding twine is coiled about the bale.

In one form of the invention, as the new bale grows in the lower portion of the baler, it continues to progressively push the upper bale higher and higher in the baler and to cause the upper bale to be released from the control of forming belts which have previously been used to compact the bale and drivingly rotate the same during its formation and wrapping cycles. Ultimately, the bale growing in the lower portion of the baler increases to such a size that the upper bale is presented to a rearwardly inclined ramp formed by adjacent belt and roller portions of the baler such that the bale simply discharges from the baler by gravity down such effective ramp.

In another form of the invention, the completely formed and preferably wrapped bale is intentionally discharged before the next bale is large enough to accomplish such function by raising positioning rollers normally disposed between the upper and lower chambers a sufficient extent as to force the bale out of the baler, whereupon the positioning rollers are retracted back down into close overlying relationship with the newly forming bale.

In another embodiment of the invention, the completely formed bale, which may or may not be wrapped with either twine or other material while in its raised position, is discharged by an upper set of positioning rollers before the next bale in the lower portion of the machine becomes large enough to force the upper bale out of the machine.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

FIG. 5 is an enlarged fragmentary view, partly in section, taken generally along line 5—5 in FIG. 2 and illustrating the manner in which rollers of the baler are attached to drivable positioning chains behind cover panels on opposite sides of the baler;

FIG. 6 is an enlarged fragmentary view of the means by which the guide rollers are connected to their positioning chains;

FIG. 7 is an enlarged end view of the hydraulic motor utilized to actuate the roller positioning chains and showing a ratchet gear and dog arrangement associated therewith for preventing the motor from driving the positioning chains in reverse;

FIGS. 10 through 16 are schematic views of the baler showing the sequence of steps it performs in making and discharging bales on a continuous basis;

FIG. 34 is an enlarged, fragmentary cross-sectional view of the baler of FIG. 31 taken substantially along line 34—34 of FIG. 32;

FIG. 35 is an enlarged, fragmentary cross-sectional view of the baler of FIG. 31 taken substantially along line 35—35 of FIG. 32;

DETAILED DESCRIPTION

Figure 1:
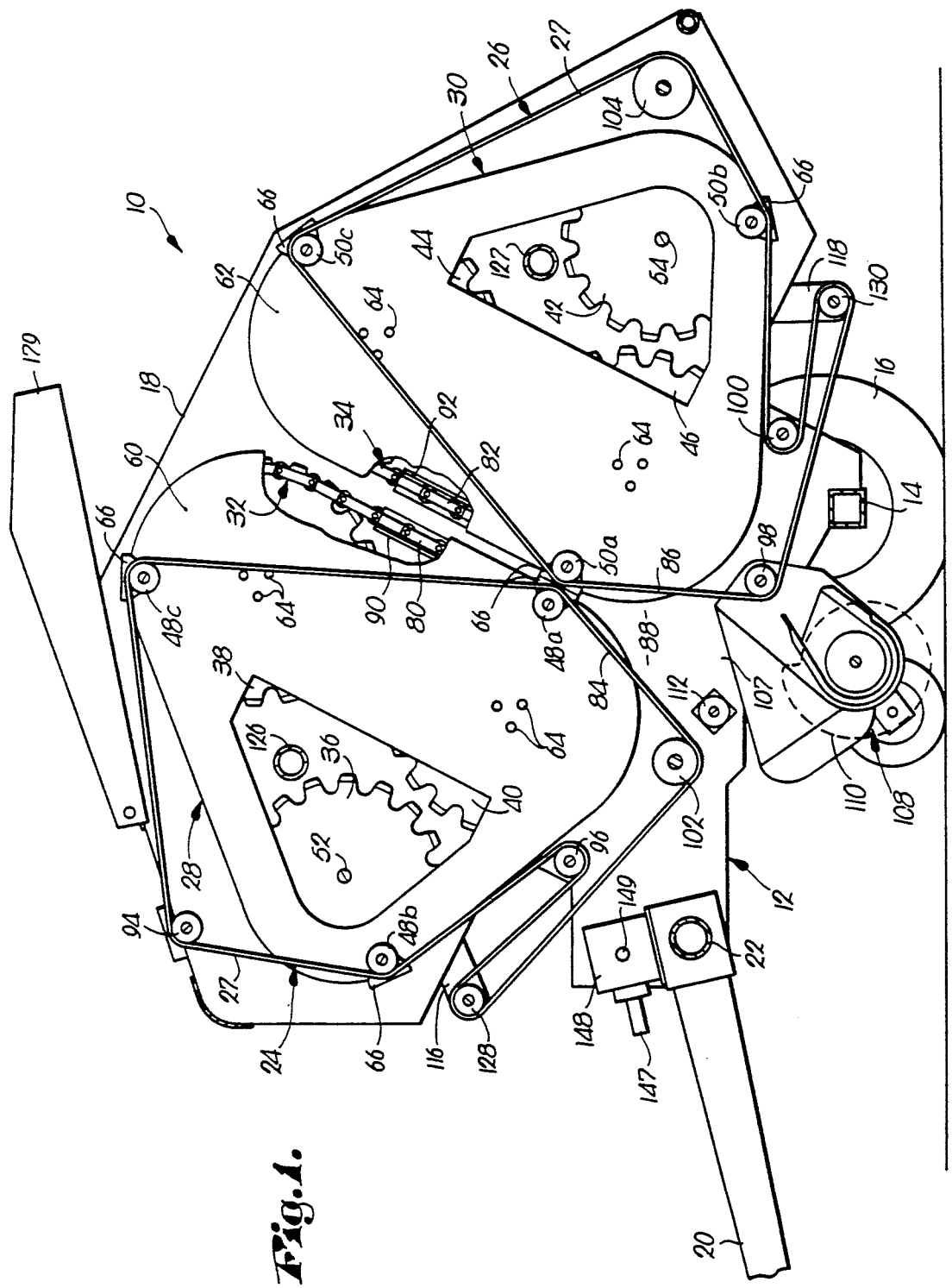
FIG. 1 is a left side elevational view of one embodiment of a large round baler constructed in accordance with the principles of the present invention with the near side wall of the baler removed to reveal internal details.

In the following description, right hand and left hand references are determined by standing at the rear of the baler and facing in the direction of forward travel.

Referring now to the drawings, and particularly to FIGS. 1 to 4, there is shown a continuous round baler generally designated by the numeral 10 and comprising a preferred embodiment of the present invention. The baler 10 is "continuous" in the sense that it can be constantly moved across the field on a nonstop basis without pausing during ejection of a completed bale.

The baler 10 has a mobile frame 12 that includes a transverse axle 14 supported by a pair of laterally spaced apart ground wheels 16. A pair of spaced apart upright side walls 18 are mounted on frame 12, and a centrally located tongue 20 extends forwardly from a cross beam 22 of frame 12 to adapt the baler 10 for connection to a towing tractor.

For forming large round bales on a continuous basis, the baler 10 has mirror-imaged front and rear sets 24 and 26 of endless flexible bale rolling members, preferably in the form of identical, side-by-side positioned endless flexible belts 27 between side walls 18. Also, the baler 10 has mirror-imaged front and rear control mechanisms 28 and 30 which function to engage the belt sets 24,26 and periodically reshape their respective closed loop configurations according to different, successive stages of operation in the baling process.

More particularly, the control mechanisms 28 and 30 include on the interior of each side wall 28 front and rear endless flexible chains 32 and 34 arranged in triangular patterns on and around corresponding sets of three triangularly-arranged, rotatable sprockets 36-40 and 42-46.

Figure 2:
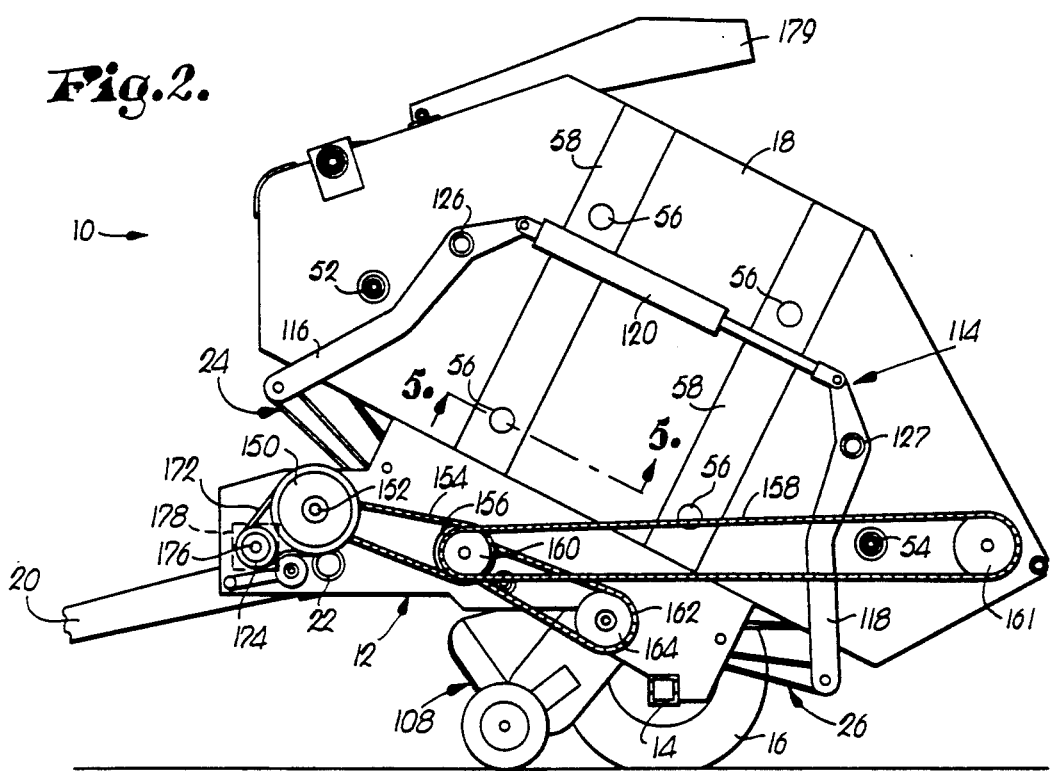
FIG. 2 is a left side elevational view, on a smaller scale, than that of FIG. 1, of the baler.
Figure 3:
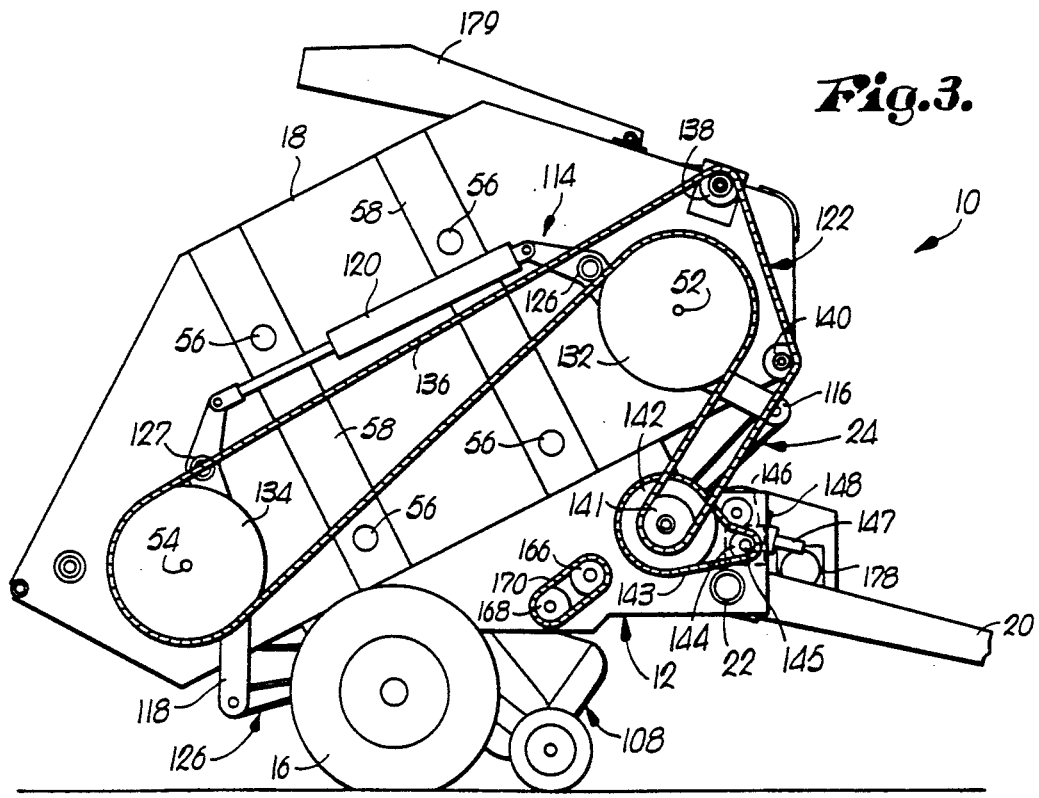
FIG. 3 is a right side elevational view, on the same scale as FIG. 2, of the baler.

Further, the front mechanism 28 includes three spaced positioning rollers which span the baler to interconnect the two front chains 32, and the rear mechanism 30 includes three spaced positioning rollers 50 which span the baler to interconnect the two rear chains 34. The two front sprockets on opposite sides of the baler are secured to a common drive shaft 52 that spans the baler, while the two rearmost sprockets 42 on opposite sides of the baler are secured to a common drive shaft 54 that spans the side walls 15 at that location. On the other hand, the remaining sprockets 38,40,44, and 46 are each carried by respective idler stub shafts 56 on opposite sides of the baler as seen in FIGS. 2 and 3.

A pair of front and rear triangular shields 60 and 62 on each side wall 18 cover the sprockets 36-40 and 42-46 so as to prevent crop material front contacting the sprockets and accumulating thereon. The shields 60 and 62 are mounted in stationary positions, being connected at 64 to the inner ends of the stub shafts 56.

Figure 4:
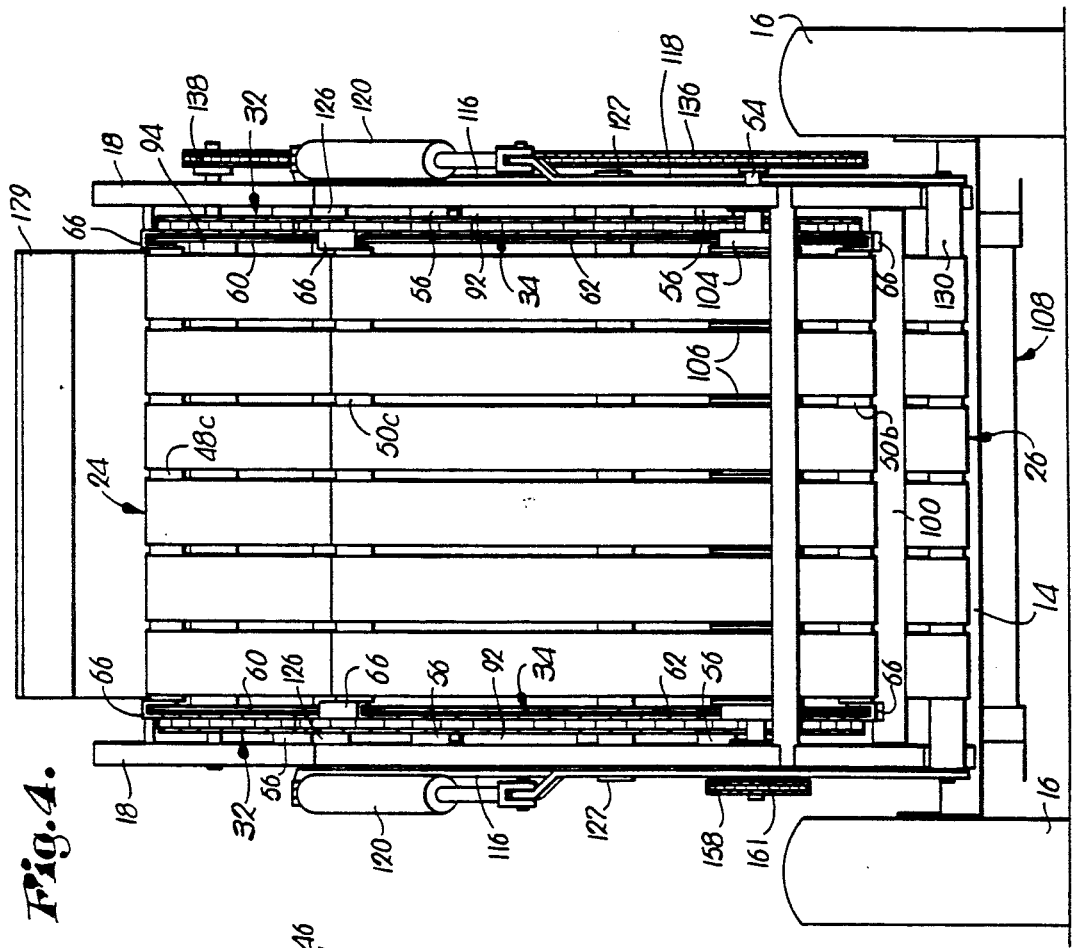
FIG. 4 is a rear elevational view of the baler.

As seen in FIGS. 4-6, the guide rollers 48 and 50 are attached at their opposite ends by generally U-shaped connectors 66 to the positioning chains 32 and 34. Each connector 66 has an outer leg portion 68 attached to one link 70 of the corresponding chain 32 or 34 and an inner leg portion 72 attached to the end of its roller. Peripheral edge margins 74 and 76 of the respective shields 60 and 62 project into the bight portions 78 of connectors 66.

Among other things, the control rollers 48,50 cooperate with the front and rear belt sets 24,26 to define successively formed bailing chambers throughout operation of the baler. In this respect, each of the front rollers 48 is matched or paired up with a corresponding rear roller 50 so as to be at corresponding positions in their respective paths of travel at all times in the baling operation. The matched pairs of rollers are identified by the same letter, for instance "a", "b", or "c", after their respective reference numerals in FIG. 1. As the rollers move in their respective triangular paths of travel, they periodically come together in their matched pairs and move in an upward course of travel along the parallel generally upright and upwardly moving stretches 80 and 82 of the chains 32,34. When in the position of rollers 48a,50a, they bring front and rear stretches 84 and 86 of the belts 24 and 26 together into an upright, triangularly-shaped starting configuration of a bale forming chamber, generally identified as 88 in FIG. 1 with the rollers 48a, 50a specifically forming a closed lid or top of the chamber 88. Since the matched pairs of rollers, 48a,50a,48b,50b, and 48c,50c are displaced from one another a distance which is greater than the length of the vertical stretches 80,82 of chains 32,34, only one forming chamber 88 with a closed lid or top can be formed at one time. Front and rear guide bars 90 and 92 on each of the side walls 18 help maintain the chain stretches 80 and 82 in their parallel relationship.

Referring still to FIG. 1, it will be seen that the front and rear sets of belts 24 and 26 are also entrained about respective front and rear pairs of rotatable idler rollers 94, 96 and 98, 100 spanning the side walls 18. Further, the belts 24 and 26 are respectively looped around front and rear oppositely rotating drive rollers 102 and 104. As seen illustrated in FIG. 4 with respect to rear drive roller 104, both drive rollers 102, 104 are provided with axially-displaced and circumferentially-extending, plate-like spacers 106 secured thereto which maintain the desired spacing between the side-by-side arranged belts. Also as shown in FIG. 1, it is the front drive roller 102 and the rear idler roller 98 which together hold the sets of belts 24 and 26 in spaced relationship to one another at a lower region of the side walls 18 so as to assist the roller pair 48a, 50a in defining the triangular starting configuration of the baler against rolling chamber 88 and in maintaining an open entry throat 107 for each successive forming chamber 88.

A crop material pickup 108 is mounted transversely across the frame 12 between its side walls 18 and below the open throat 107. The pickup 108 has a plurality of crop material gathering tines (not shown) which move in the rotational path represented by the dashed line 110 in FIG. 1 for delivering crop material from the field up through the throat 107 and chamber 88 as the baler moves across the field. Also, above the pickup 108 and located nearer to the front drive roller 102 than to the rear idler roller 98, a powered roller 112 extends transversely across the open bottom of the chamber 88 at the upper, forward extremity of throat 107 and is rotatably mounted to the opposite side walls 18. The clockwise-rotating roller 112 (viewing FIG. 1) cooperates with the triangularly-configured stretches 84 and 86 of the respective belts 24 and 26 to roll crop material received in the chamber 88 in a counterclockwise direction (viewing FIG. 1) in forming a round bale therein.

Formation of a round bale of desired density in the bale rolling chamber 88 is accomplished by applying a desired level of pressure on the crop material as it is rolled by the belts 24, 26, while, at the same time, allowing the chamber to grow in size to accommodate growth in the size of the bale. In this respect, a tensioning mechanism, generally designated 114 (FIGS. 2 and 3), is provided on the baler 10 for tensioning the front and rear sets of belts 24 and 26.

More particularly, as seen in FIGS. 1–4, the tensioning mechanism 114 includes front and rear take-up arms 116 and 118 on each side wall 18 and a pair of hydraulic actuators 120 therefor. The front arms 116 are interconnected intermediate their ends and across the baler by a common torque tube 126, while the rear arms 118 are similarly interconnected by a torque tube 127. Tubes 126,127 are journalled the side walls 18 so as to adapt the arms 116 and 118 for fore-and-aft swinging movement about the axes of tubes 126,127.

The tensioning mechanism 114 further includes a pair of take-up rollers 128 and 130 spanning the baler and are rotatably mounted at their opposite ends to the lower ends of the front and rear take-up arms 116 and 118. The front and rear take-up rollers 128 and 130 are back wrapped, as are the front and rear idler rollers 96 and 100, by the respective front and rear sets of belts 24 and 26 so as to "store" extra lengths of the belts when needed for expansion of the bale forming chamber 88. When the take-up arms 116 and 118 are pivoted counter-clockwise and clockwise respectively (viewing FIG. 2), the extra lengths of belts 24 and 26 are paid out to permit chamber expansion, whereas when they pivot in the opposite rotational senses, belt length is stored between the rollers 96, 128 and 100, 130 so as to permit starting of the chamber 88 at its initial contracted size.

The hydraulic actuators 120 extend between and are coupled to the upper ends of the front and rear take-up arms 116 and 118 along the exterior of the opposite side walls 18. In such manner, upon extension or contraction of the actuators 120 the front arms 116 and rear arms 118 are concurrently pivoted the same amount although in opposite directions. Thus, the same amount of belt length is paid out or stored in the front belts as in the rear belts.

The two positioning control mechanisms 28,30 are powered by a drive train 122 disposed along the right frame side wall 18 as seen in FIG. 3. The drive train 122 includes a pair of large, front and rear driven sprockets 132 and 134 secured to front and rear shafts 52 and 54 respectively which extend outwardly from the right side wall 18. A drive transmitting, endless chain 136 back wraps and crosses over an imaginary line connecting the rotational axes of the sprockets 132 and 134 so as to drive the sprockets in opposite rotational directions indicated by the arrows in FIG. 3. The drive chains 136 is also entrained about a pair of idlers 138 and 140 rotatably mounted to the right side wall 18 forward of the front sprocket 132. The idlers route the drive chain 136 clear of the front sprocket 132 for entrainment about a lower sprocket that inputs motion to chain 136. Sprocket 141, in turn, is fixed for rotation with another, larger sprocket 142 driven by an endless chain 143 entraining a smaller, forwardly located sprocket 144 fixed on the output shaft 145 of a source of rotary power, such as a hydraulic motor 146 (FIGS. 3, 7, 8, and 9).

The source of motive power for the pickup 108 and the belt drive rollers 102,104 is the power take-off shaft of the towing tractor from which rotational motion is transmitted by telescoping shafts (not shown) to the input shaft 147 of a right angle gear box 148 on the front part of the baler.

From an output shaft 149 (FIG. 1) of the gear box 148, rotational motion is transmitted to a large sheave 150 (FIG. 2) through a shaft 152 and to a sprocket (not shown) behind the sheave 150 secured to the same drive shaft 152 as the sheave 150. An endless chain 154 transmits rotation from the sprocket on shaft 152 to a sprocket 156 on one end of the front drive roller 102 and from the front drive roller 102 to the rear drive roller 104 via another chain 158 entrained about a pair of sprockets 160 and 161 attached to the respective rollers. In such manner, the rollers 102 and 104 and thereby the front and rear sets of belts 24 and 26 are driven in the same clockwise sense viewing FIG. 1 which causes their adjacent stretches 84 and 86 to move in opposite generally vertical directions, the rear stretch 84 moving upwardly and the front stretch 86 moving downwardly. Further, another endless chain 162 entrains a sprocket 164 on the pickup 108 for rotating its tines in the direction of the arrow seen in FIG. 1. As viewed in FIG. 3, a sprocket 166 on the right side of the front drive roller 102 and a sprocket 168 on an end of the bale chamber roller 112 are entrained by a chain 170 for driving the roller 112 from the drive roller 102.

A belt 172 (FIG. 2) transmits rotation from the sheave 150 on shaft 152 to a smaller sheave 174 on the input shaft 176 of a hydraulic pump 178. The pump 178 is hydraulically connected to the hydraulic actuators 120 for the take-up arms 116,118 and to the hydraulic motor 146 for the control mechanisms 28 and 30.

OPERATION

Figure 11:
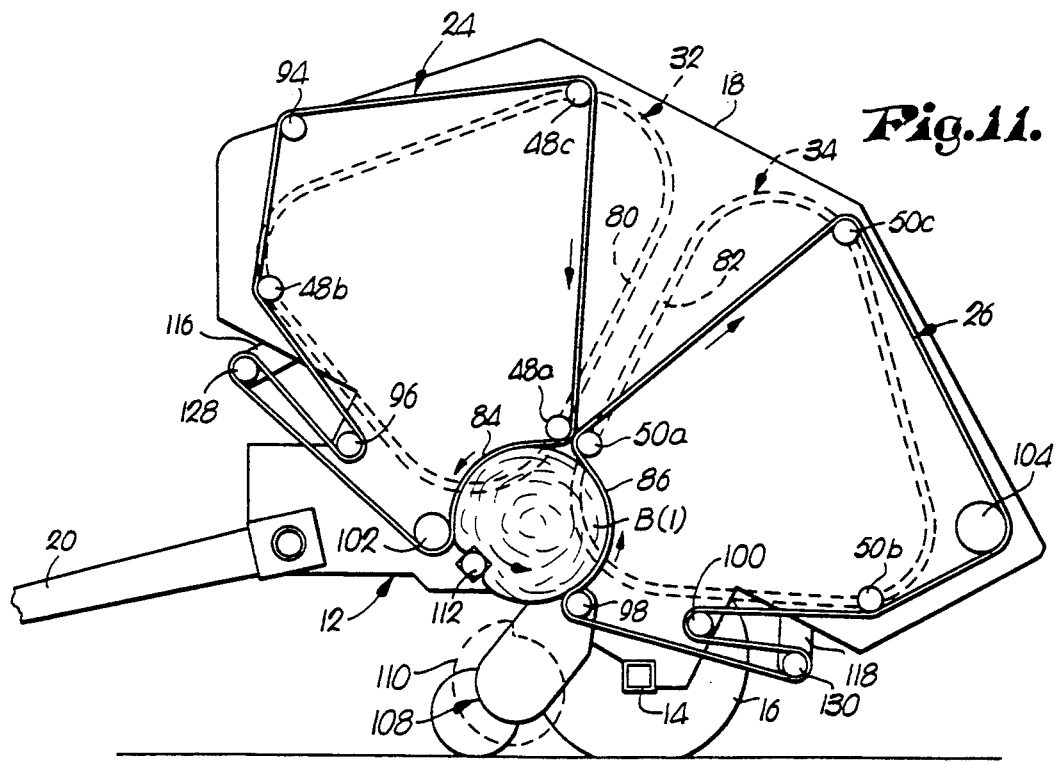
Figure 12:
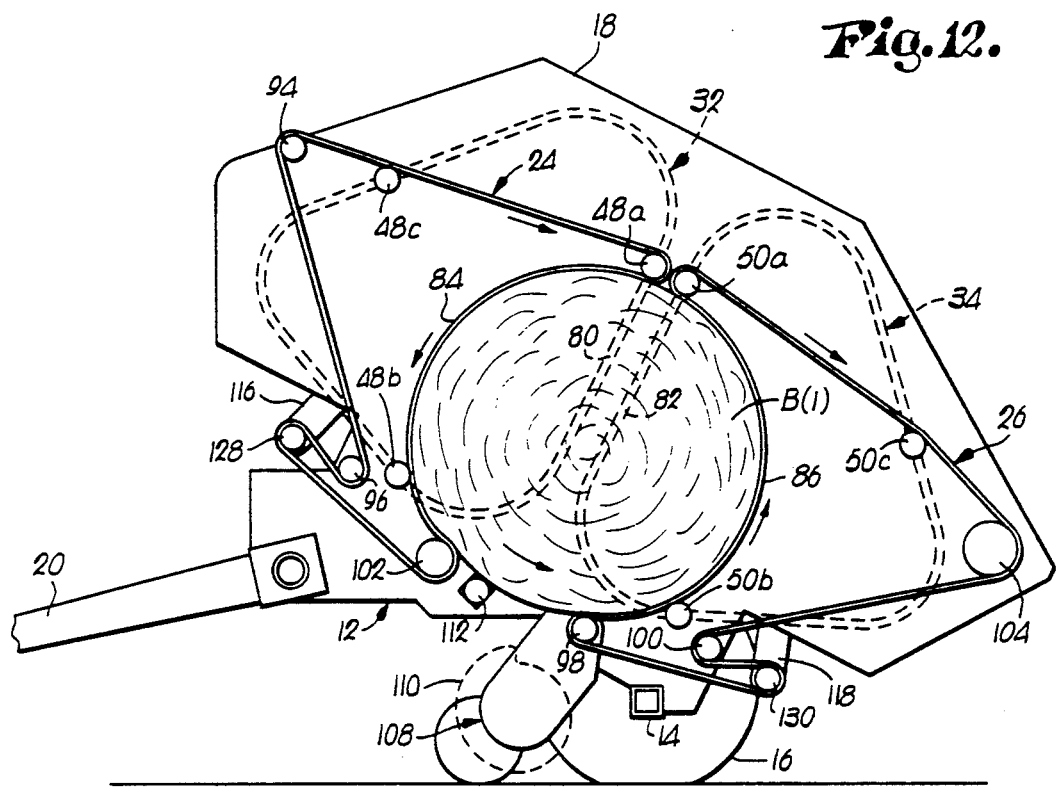

The operation of the continuous baler is illustrated schematically in FIGS. 10-16. As the baler moves across the field in the "empty" condition of FIG. 10, the pickup 108 continuously lifts windrowed materials off the ground and introduces them into the baling chamber 88 through the bottom, open throat entrance thereof. Such materials are acted upon by the counter-moving belt stretches 84 and 86 to cause the material to tumble forwardly within chamber 88 and progressively coil up into a larger and larger bale as illustrated in FIG. 11. The positioning rollers 48a and 50a resist upward movement at this time to provide yieldable down pressure against the forming bale, but as the bale continues to grow and exert sufficient upwardly directed force against the rollers 48a,50a, the latter shift upwardly as illustrated in FIG. 12.

By the time the bale B(1) reaches the diameter illustrated in FIG. 12, it is full size. Consequently, at that time a strand of binding twine or the like may be introduced from an overhead bale wrapper unit 179 (FIG. 1) down to the rotating bale B(1) to be entrained by the latter, which causes the twine to start wrapping around the rotating bale.

Figure 13:
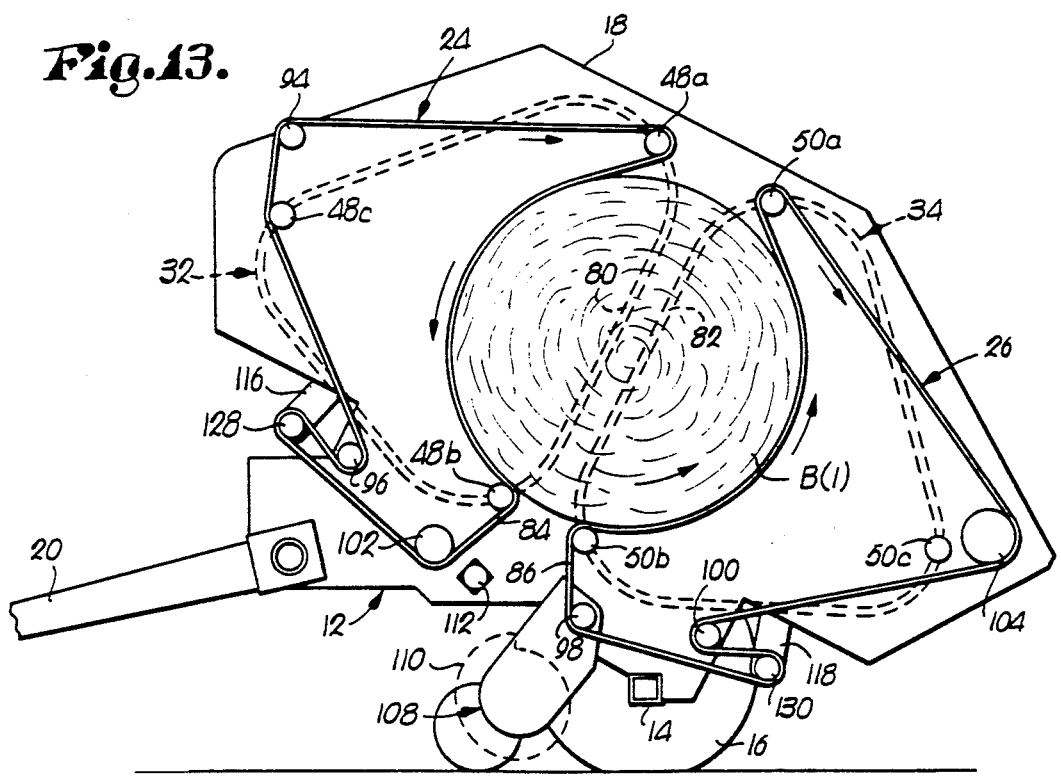

Essentially simultaneously with commencement of bale wrapping, power is supplied to the positioning chains 32 and 34 to cause the next positioning rollers 48b,50b to start moving under the bale B(1) and lifting the bale B(1) toward a raised position, such action being illustrated in FIG. 13. Ultimately, the positioning rollers 48b,50b come together and move a short distance up along their upward course of travel as illustrated in FIG. 14, at which point the rollers 48b,50b momentarily pause.

Figure 14:
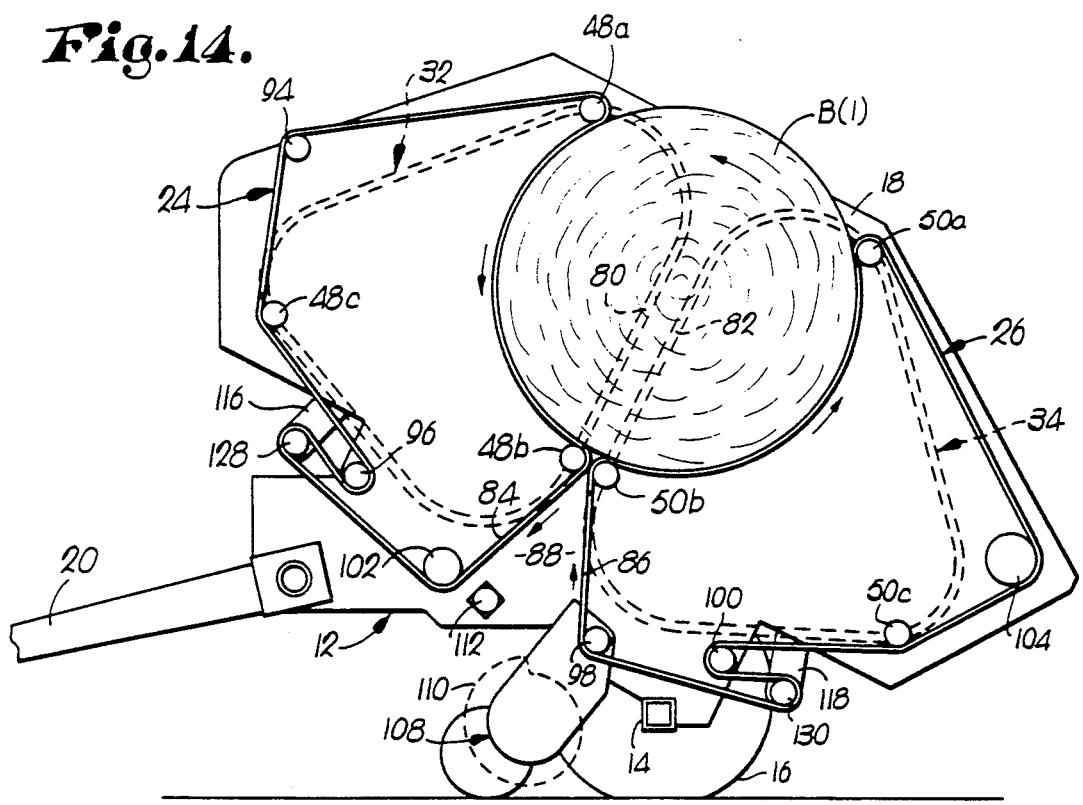

The bale B(1) continues to rotate in the FIG. 14 position so that the binding cycle may be completed. Likewise, it has continued to rotate all the while that the rollers 48b,50b have raised the bale B(1) from the lower position of FIG. 12 to the higher position of FIG. 14.

Simultaneously, new crop material has continued to enter the baler via the pickup 108 as the baler has continued moving non-stop across the field. Such new material has been introduced during this time into a new baling chamber formed beneath the rising bale B(1) and confined at the top by rollers 48b,50b as illustrated in the transition from FIG. 13 to FIG. 14. As the two rollers 48b,50b come together in the FIG. 14 position, they effectively close off the upper end of the new baling chamber 88 and cause material which might otherwise flow up to the bale B(1) to instead turn down along the front belt stretch 84 and start coiling into a new bale B(2) as illustrated in FIG. 15.

Figure 15:
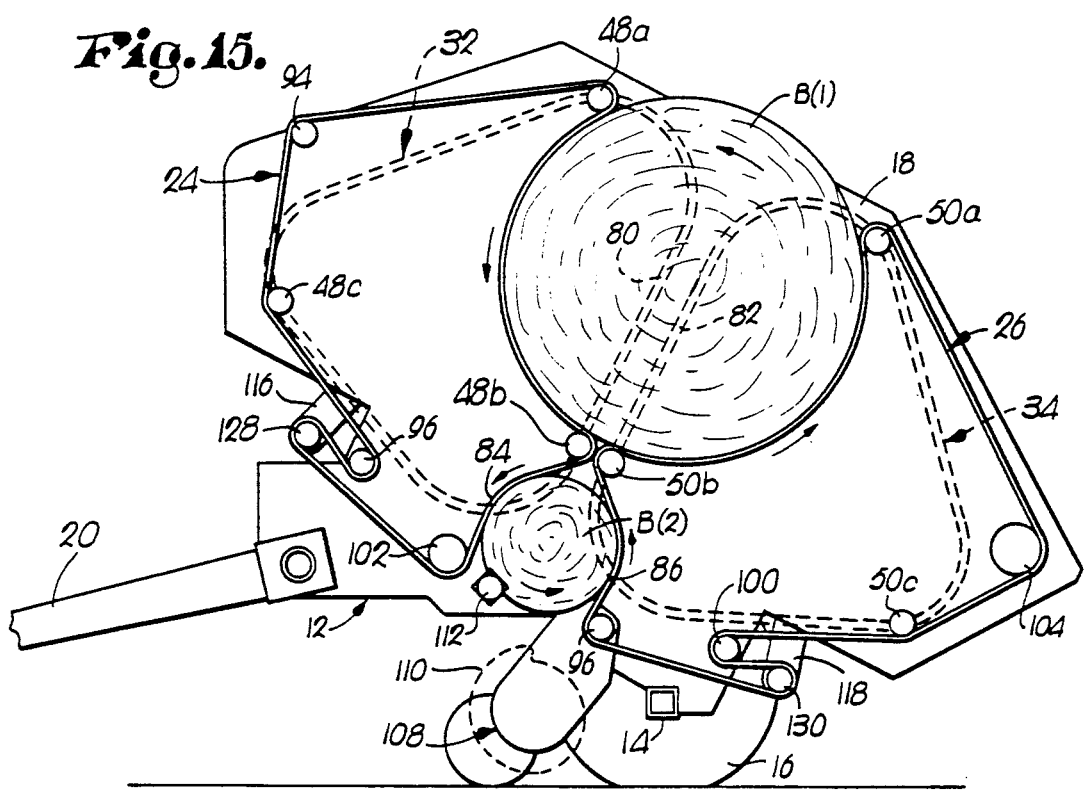

As the new bale B(2) begins to form as illustrated in FIG. 15, the rollers 48b,50b resist upward movement, but such resistance is overcome as the bale B(2) continues to enlarge. Consequently, as bale B(2) continues to grow, it also pushes the overhead bale B(1) further upwardly. This movement also has the effect of separating the rollers 48a and 50a so that, by the time the baler reaches the condition of things illustrated in FIG. 16, the bale B(1) is fully released by the belts and can gravitate down a rearwardly inclined ramp defined by rollers 50a,50b and the upper stretch of the rear belts.

Thereafter, formation of the bale B(2) continues until such time as it reaches the full size condition of FIG. 12, whereupon the cycle is repeated.

It is to be noted that, depending upon the type of binding material used for the bales, the wrapping cycle may or may not start while the bale is still in the main baling chamber. With twine as the wrapping medium, and in order to maintain the integrity of the bale during such time as it is subjected to squeezing and lifting stresses by the positioning rollers, it has been found desirable to start the binding cycle while the bale is still in its initial, lowered position.

HYDRAULIC CONTROL CIRCUIT

Figure 8:
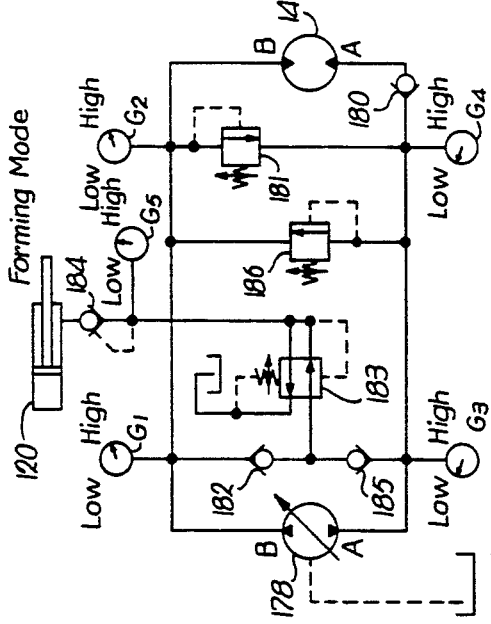
FIGS. 8 and 9 are schematic views of the hydraulic circuit and components for controlling operation of the positioning chains and bale-forming belt tension, showing the circuit and components in a chain retarding mode in FIG. 8 and in a bale lifting mode in FIG. 9.
Figure 9:
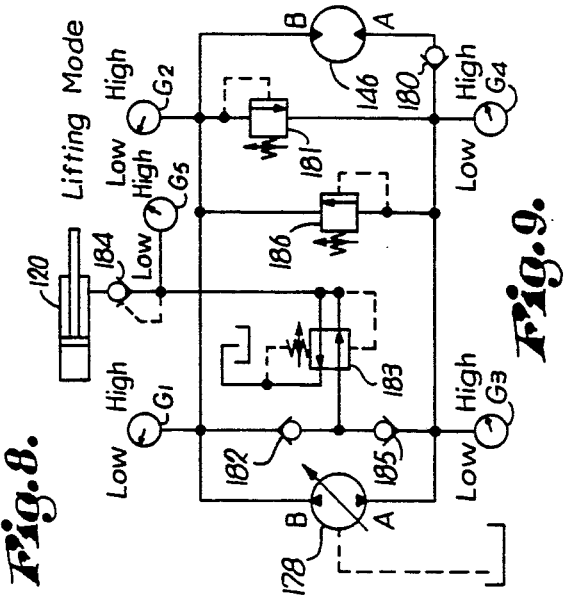
Figure 10:
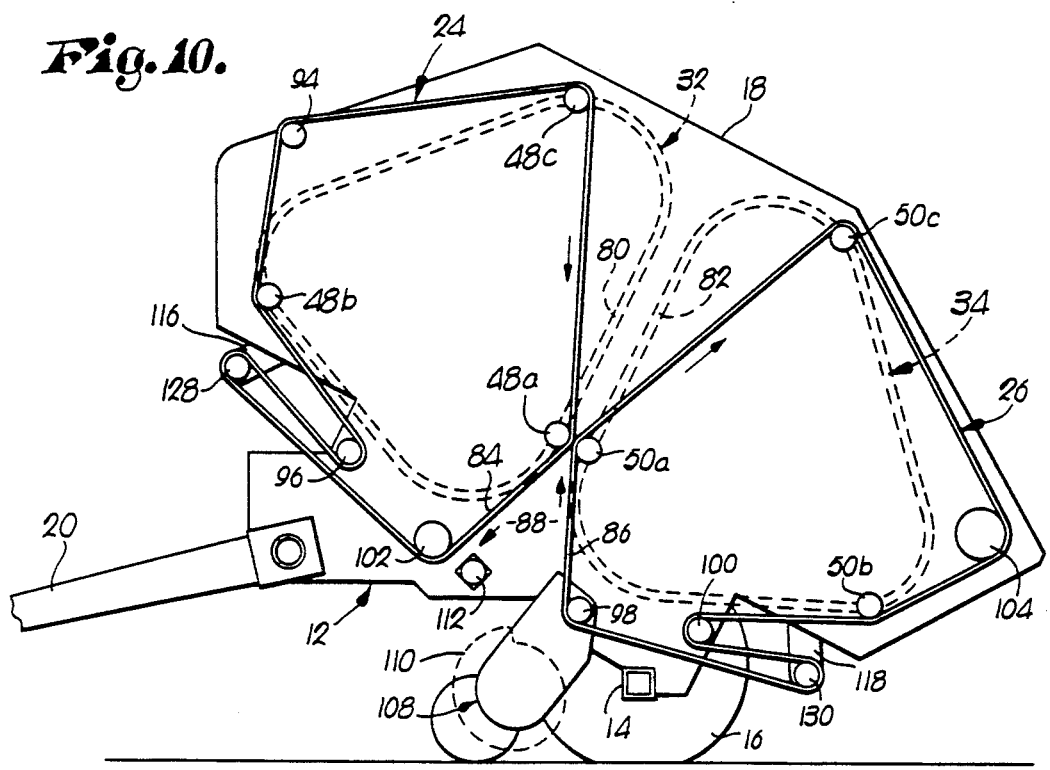

FIGS. 8 and 9 schematically illustrate a suggested hydraulic circuit for controlling the tensioning cylinders 120 and the hydraulic motor 146. During mere forming of a bale, it is necessary for the hydraulic circuit to apply compactive pressure through the cylinders 120, and it is desirable that such pressure be constant throughout the forming process. FIG. 8 illustrates the condition of things in the circuit during what will hereinafter be referred to as the "forming mode" of the circuit.

On the other hand, when a finished bale is being lifted to the bale wrapping position, it is necessary for the control circuit to apply lifting force to the next two positioning rollers 48,50, while at the same time applying the same tension to the forming belts as before. In FIG. 9, the condition of things therein illustrated has been denoted as the "lifting mode".

The variable displacement pump 178 is mechanically linked to a control cam (not shown) secured to the shaft 52 associated with the front sprocket 36. Thus, the rotative position of the sprocket 36 determines the rotative position of the control cam, and hence also the position of the swash plate within the pump 178. This is significant because, depending upon the position of the swash plate, high pressure oil will be pumped by the pump 178 either along circuit path A—A or B—B toward the motor 146.

In the forming mode, high pressure oil is introduced by the pump 178 into circuit path B—B, as indicated by the two gauges G1 and G1. However, the motor 146 cannot be driven by the pressurized oil in path B—B because a check valve 180 adjacent to motor 146 in path A—A blocks the discharge of oil from motor 146 into path A—A. Accordingly, the high pressure oil in path B—B flows through a pilot-operated relief valve 181 to path A—A and returns to the pump 178. As indicated by gauges G3 and G4 in path A—A, the pressure level in path A—A at this time is relatively low.

It will be remembered, however, that even though the motor 146 is not to be driven hydraulically during the forming mode, it is important that the motor 146 be capable of "mechanical" rotation by the bale growing within the chamber 88. In this respect, since the bale continues to grow, it will push upwardly on the overhead rollers 48,50, causing the chains 80,82 to be moved, which in turn rotates the output shaft of the motor 146. Oil which is displaced by motor 146 during such rotation by the growing bale simply moves reversely in path B—B and over to path A—A via the relief valve 181.

It is important, of course, that belt tension be constantly applied to the forming bale when the circuit is in the forming mode, and this is accomplished by continuing to pressurize the cylinders 120 even though the motor 146 is not hydraulically driven at this time. In this respect, when the path B—B is subjected to high pressure oil by the pump 178, pressurized oil also flows through a check valve 182, thence through a pressure-reducing valve 183, and finally to the cylinders 120 via a pilot-operated check valve 184. As illustrated by the gauge G5 slightly upstream from the pilot-operated check valve 184, the pressure on the downstream side of the reducing valve 183 is something less than that in path B—B when the latter is fully pressurized. The reducing valve 183 actually serves to prevent the pressure seen by the cylinders 120 from exceeding a certain predetermined amount, regardless of the pressure level which may be reached in paths A—A or B—B. This can be important during discharge of a bale when, because of a change in belt length, the cylinder 120 may be caused to extend to take up belt slack, yet it is necessary that the actual pressure in the system and thus the force applied by the belts to the bale forming in chamber 88 not exceed the chosen level. Valve 183 has the ability to maintain the selected pressure level under those circumstances.

When the rollers 48a,50a have been moved upwardly by the growing bale to such an extent that the bale is now full sized, the cam on shaft 52 will likewise have been rotated to such a position that it shifts the swash plate within the pump 178 into position for starting the lifting mode of the hydraulic circuit as illustrated in FIG. 9. When the swash plate is thus shifted, the pump 178 introduces high pressure oil into path A—A of the circuit, as indicated by the gauges G3 and G4 in FIG. 9. This time, the oil attempting to enter the motor 146 is permitted such entrance by the check valve 180, and consequently, the motor is driven in such a manner as to power the next positioning rollers 48b,50b into position underneath the finished bale and up along the course of travel of such rollers to raise the bale toward the tying location.

Note during this operation of the motor 146 that high pressure oil in circuit path A—A continues to be presented to the pressure-reducing valve 183 through a check valve 185 in one of the lines bridging the two circuit paths A—A and B—B. Oil is preventing from short circuiting to the circuit path B—B at this time,. however, because of the other check valve 182. Consequently, even throughout operation of the motor 146 to raise the finished bale, tension is maintained on the belts by the cylinders 120 since oil continues to be presented therethrough through the pressure-reducing valve 183 and the pilot-operated check valve 184. It is to be noted, however, that the pressure seen by the cylinders 120 is something less than that experienced when circuit path A—A, as illustrated by gauge G5 when compared to gauges G3 and G4. A pilot operated, pressure-relief valve 186 may be provided between the circuit paths A—A and B—B for the purpose of providing a safety relief for circuit A—A in the event that, for some unexpected reason, the motor 146 is jammed or otherwise prevented from rotating when circuit A—A is subject to high pressure.

OPTIONAL FLOW-SEPARATING FORK

FIGS. 17-21 are directed to additional structure which may be helpful in certain conditions to prevent freshly entering crop materials from tending to flow up to and become a part of the bale B(1) after such bale is raised from its normal lowered position and continues to rotate both during such initial raising and continued elevation and rotation during application of the wrapper. While the positioning rollers 48,50 are operable to close together and form the top of the baling chamber 88 as they start upward along the center of the machine, there is still a tendency for materials to feed up between the rollers 48,50 at this time, particularly in view of the inherent self-feeding action of the bale B(1) as it rotates counter-clockwise and forms a feeding nip area at the point of its engagement with the roller 50.

Figure 18:
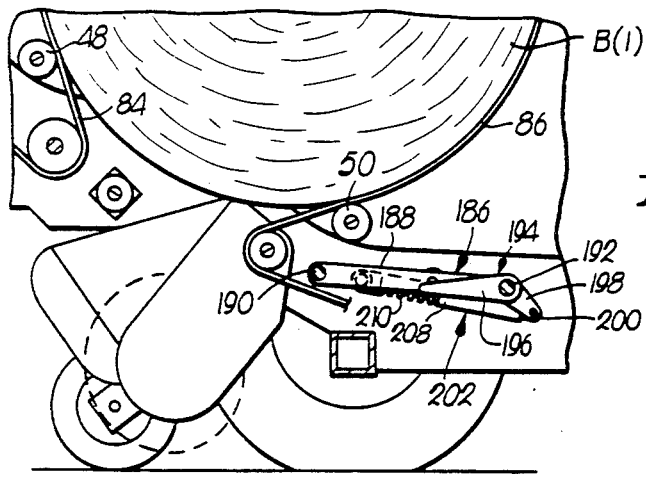
FIGS. 18 through 21 are fragmentary elevational views of the left side of the baler with the near side wall removed to show details of a fork assembly which may be added to the baler to aid in separating incoming crop materials from a finished bale as it is raised to the wrapping station in the baler.

The separating fork is denoted broadly by the numeral 186 and is normally maintained in its stored or standby position of FIG. 18 wherein the fork 186 lies in a generally fore-and-aft attitude below and behind the baling chamber 88. The fork 186 includes a pair of arms 188 (only one being shown) situated on opposite inboard sides of the baler and fixed at inner ends to a shaft 190 spanning the baler and journalled at opposite ends by the side walls 18. At their outer ends, the arms 188 are provided with a cross shaft 192 which interconnects such opposite ends and forms a transverse pivot for the head 194 of the fork having a plurality of laterally spaced tines 196 which are aligned with the spaces between the rear set of belts 86 so as to be able to project forwardly through such spaces and between the belts during operation as hereinafter explained. A pair of cranks 198 (only one being shown) at opposite lateral ends of the head 194 are rigidly affixed thereto and projected normally rearwardly therefrom to respective, pivotal connections 200 with spring-loaded, telescoping links 202 which are pivoted at their opposite ends to the corresponding side wall 18 by pivots 204. Each of the telescoping links 202 includes a central rod 206 and an external sleeve 208 that can slidably reciprocate on the rod 206, there being a compression spring 210 coiled around the rod 206 between the lower end of the sleeve 208 and the pivot 204. Thus, each sleeve 208 is yieldably biased away from the pivot 204 to the extent permitted by an internal limit (not shown) to cause the link 202 to assume a maximum length condition illustrated in FIGS. 18, 19, and 20.

Figure 17:
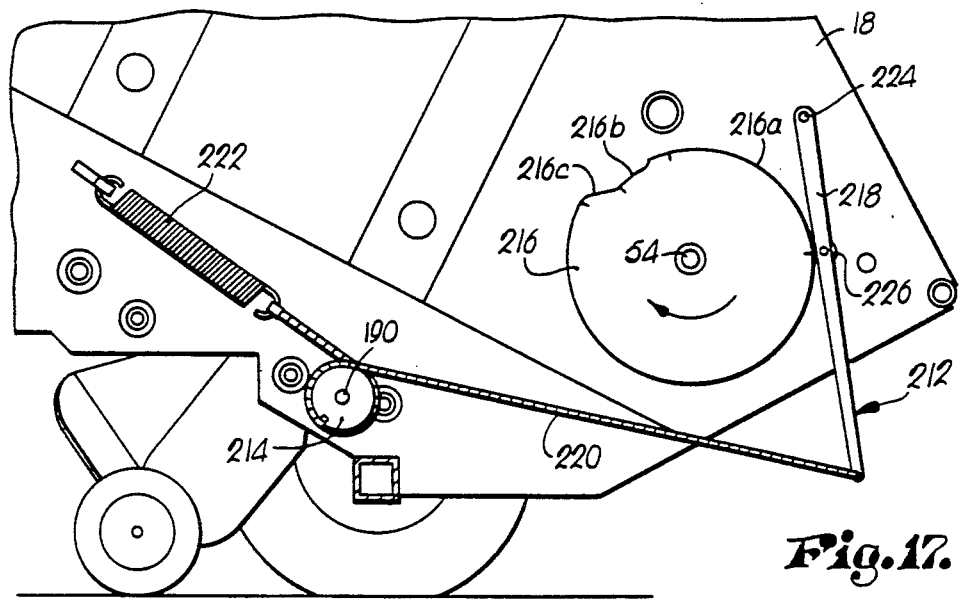
FIG. 17 is a fragmentary elevational view of the left side of the baler with the ground wheel removed to reveal details of a control for a fork assembly as depicted in FIGS. 18-21.

The fork 186 is operated by control apparatus broadly denoted by the numeral 212 illustrated in FIG. 17 on the left side of the baler. In this respect the shaft 190 upon which the arms 188 of fork 186 are mounted projects through the left side wall 18 of the baler and is rigidly secured to a suitable sprocket 214 for rotation of the sprocket 214 and shaft 190 as a unit.

Rotation of the sprocket 214 is, in turn, caused and controlled by remaining components of the apparatus 212 including a cam 216, cam follower lever 218, drive chain 220, and tension spring 222. The lever 218 has a pivotal connection 224 at its upper end with the side wall 18 and is provided intermediate its opposite ends with a follower roller 226 that rides on the periphery of the cam 216. The chain 220 attached to the lower end of the lever 218 extends forwardly therefrom and wraps around the sprocket 214 for almost 360° of wrap, whereupon it connects at its opposite end with the tension spring 222 such that the follower roller 226 of lever 218 is constantly biased into engagement with the periphery of cam 216.

The cam 216 is fixed to the stub shaft 54 associated with the lower rear sprocket wheel 42 of positioning apparatus 30 such that cam 216 rotates with the sprocket 42 and is timed with the positioning mechanism 30. Much of the periphery of the cam 216 is concentric with the axis of shaft 54 such that there is no swinging movement of the lever 218 about pivot 224 and hence no movement of the fork 186 out of its stored position of FIG. 18. The stored position of the fork 186 in FIG. 18 corresponds to the condition of the cam 216 and position of the lever 218 as shown in FIG. 17. The operating link 202 of the fork 186 causes the head 194 thereof to be folded down into a retracted position at this time.

Figure 19:
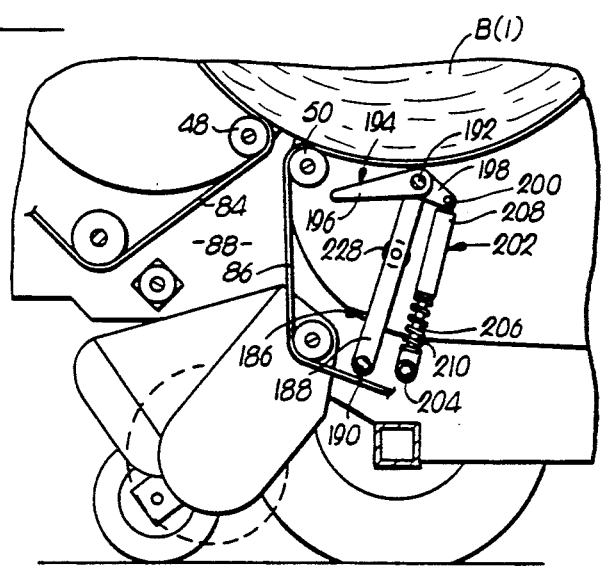

As the bale B(1) is lifted by the positioning rollers 48 and 50, caused by operation of the positioning mechanisms 28 and 30, the cam 216 is caused to rotate in a clockwise direction viewing FIG. 17 such that a peripheral segment 216a becomes presented to the lever 218. Because the segment 216a is of a progressively decreasing radius, the lever 218 is allowed to swing in a clockwise direction under the influence of the tensioning of the tension spring 222, causing the sprocket 214 to be rotated in a counterclockwise direction and thereby swing the fork 186 upwardly out of its stored position as illustrated in FIG. 19. Because the operating link 202 is at its full extension at this time, such swinging of the fork 186 causes the head 194 thereof to flip out in a clockwise direction from its folded or retracted position of FIG. 18.

Figure 20:
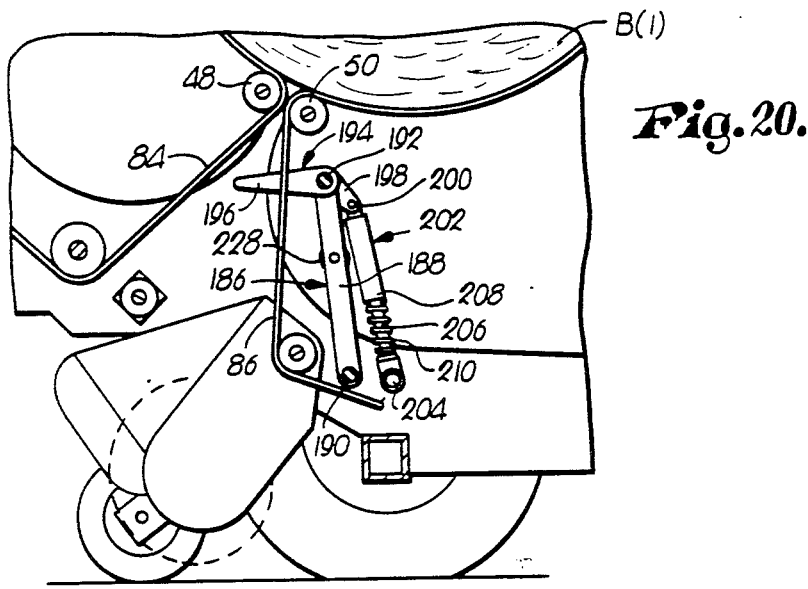
Figure 21:
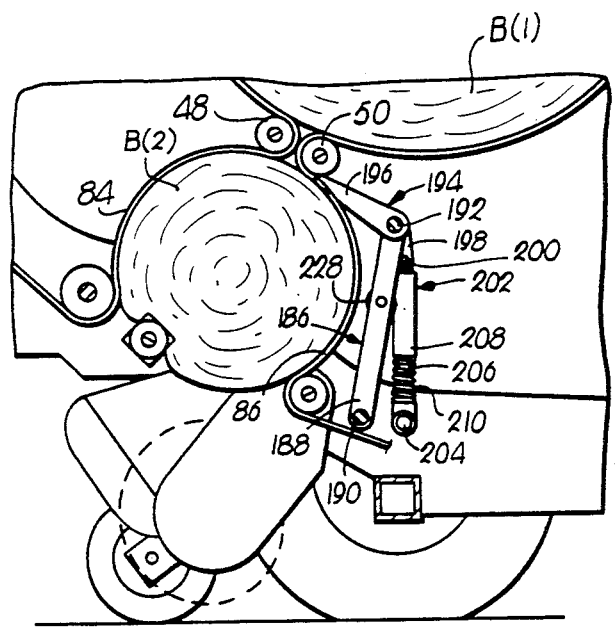

As the bale B(1) continues to rise within the baler, the fork 186 continues to swing toward the chamber 88 until the positioning rollers 48,50 come together and close off the top of the new baling chamber 88 as shown in FIG. 20. By this time, a second peripheral segment 216b of cam 216 will have come under the follower 226 of lever 218, and because segment 216b is an abruptly radially reduced segment, the fork 186 will have moved ahead quickly into its operating position of FIG. 20 wherein the tines 196 project into and substantially across the chamber 88 a short distance below the rollers 48,50. Such abrupt movement of the tines 196 into the chamber 188 has the effect of cutting through any flowing stream of material tending to move up between rollers 48,50 to the overhead bale B(1) and to deflect such separated stream downwardly and forwardly toward the front of the chamber 88. Formation of the new bale core B(2) then commenced within the chamber 88, and as the bale core B(2) grows, it bears against the tines 196 to deflect the same in a clockwise direction, compressing the springs 206 of telescoping links 202.

As the bale core B(2) grows even further, raising the rollers 48,50, such movement of rollers 48,50 by bale B(2) has the effect of also rotating the cam 216 through mechanisms 28,30 causing a third peripheral segment 216c of cam 216 to come under the roller 226 of lever 218. Segment s16c is a segment of rapidly increasing radius so that lever 218 is swung in a counterclockwise direction to likewise swing the fork 186 in a counterclockwise direction away from the bale B(2) and back down toward, and ultimately to, its stored position of FIG. 18. Rollers 228 on the arms 188 of fork 186 are disposed for riding engagement with the bale B(2) as the latter grows and the fork 186 is raised up into its operating position such that growth of the bale will also have a tendency to swing the fork 186 back out of the chamber 88 when presence of the fork 186 is no longer needed.

EMBODIMENT OF FIGS. 22–30

The continuous baler of FIGS. 22–30 is substantially identical in principle with the baler of FIGS. 1–21, except that certain improvements are presented which provide improved bale quality and more trouble-free operation. In view of the substantial similarities involved between the two embodiments, the embodiment of FIGS. 22–30 will only be briefly described.

Figure 23:
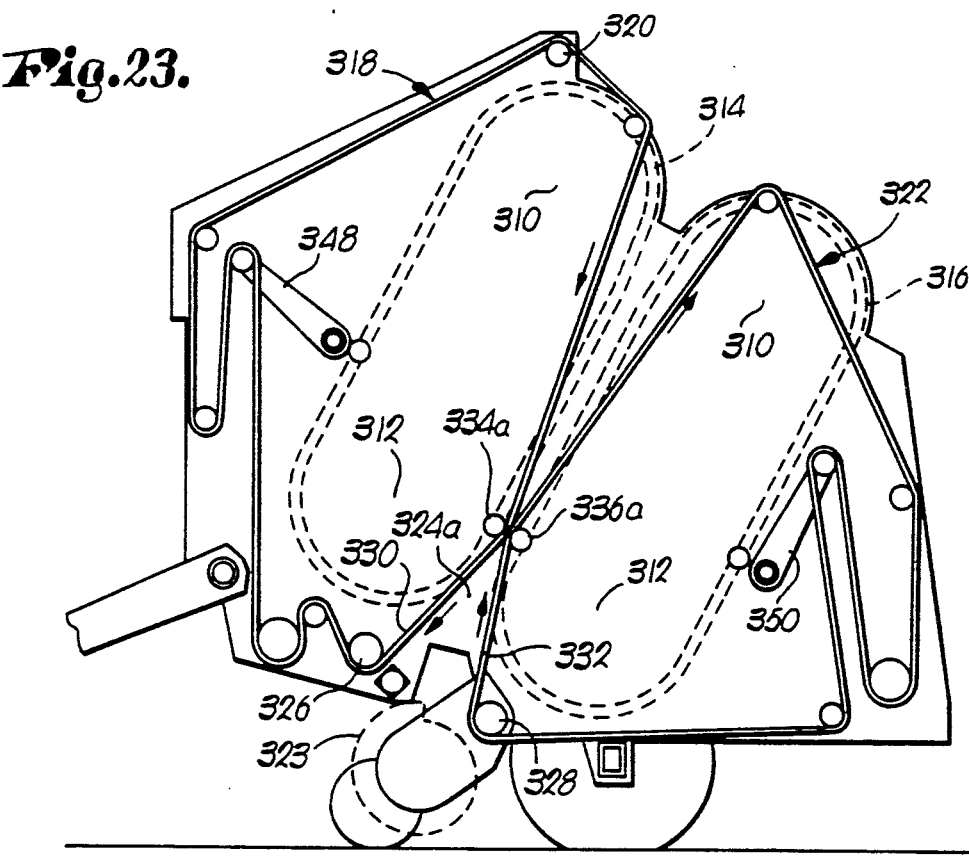
FIGS. 23 through 30 are schematic views of the second embodiment of the invention showing the sequence of steps which occur in making and discharging bales on a continuous basis with the second embodiment.

A primary distinction between the two balers resides in the differences in the configurations of the paths of travel followed by the positioning rollers for the forming belts. While it will be seen that the paths of travel of the positioning rollers in the first embodiment are generally triangular in nature, the paths of travel of the corresponding rollers in the second embodiment are generally elliptical but with rectilinear side stretches instead of arcuate side stretches as in a true ellipse. In this respect, instead of three guide sprockets for each conveying chain of the rollers, the second embodiment utilizes only a pair of such sprockets having their axes of rotation at points 310 and 312 as illustrated in FIG. 23. Consequently, the positioning chains 314 and 316 for the front and rear groups of guide rollers respectively move in the generally elliptical patterns illustrated by the dashed lines in FIGS. 23–30, which have longer rectilinear stretches along their common course of travel than in the first embodiment.

Furthermore, the front set of belts 318 in the second embodiment have a stationary apex presented by the stationary roller 320 that is substantially higher than the corresponding apex of the rear belts 322 at their highest point of travel which, rather than being stationary, is continuously moving. As will be seen from the operation hereinafter described, this provides a sort of backstop or barrier that prevents a fully formed and wrapped bale from sitting atop the belts when its baling cycle is completed and gives such bale extra encouragement to roll down the discharge ramp of the baler and onto the ground. This condition is illustrated, for example, in FIG. 29.

Figure 22:
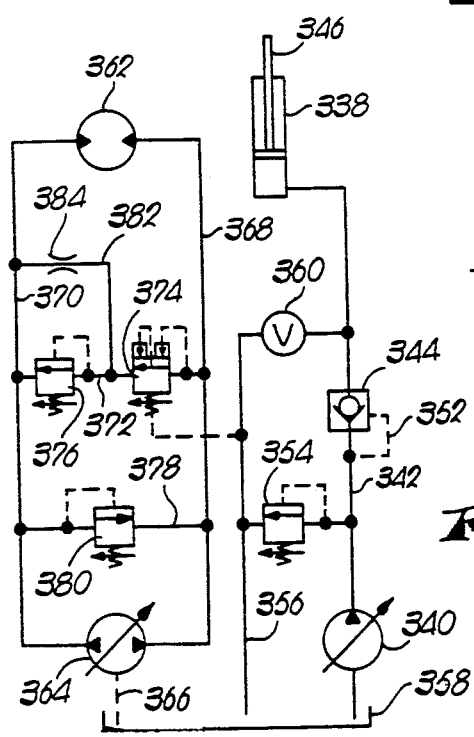
FIG. 22 is a schematic illustration of the hydraulic circuit and control components with respect to a second embodiment of the invention.

A different hydraulic control system for the positioning rollers has also been provided for the second embodiment so that the rollers may be utilized to eject a completely wrapped bale from the baler at an earlier point in formation of the next succeeding bale than was the case with the first embodiment. Thus, the finished and wrapped bale is not subjected to continued rolling and abrasion by the belts within the baler beyond that period of time which is absolutely necessary. This new action of the positioning rollers is illustrated, for example, in FIGS. 29 and 30. The new hydraulic control circuitry capable of carrying out such control and operation of the positioning rollers is illustrated in FIG. 22.

OPERATION OF THE SECOND EMBODIMENT

Figure 24:
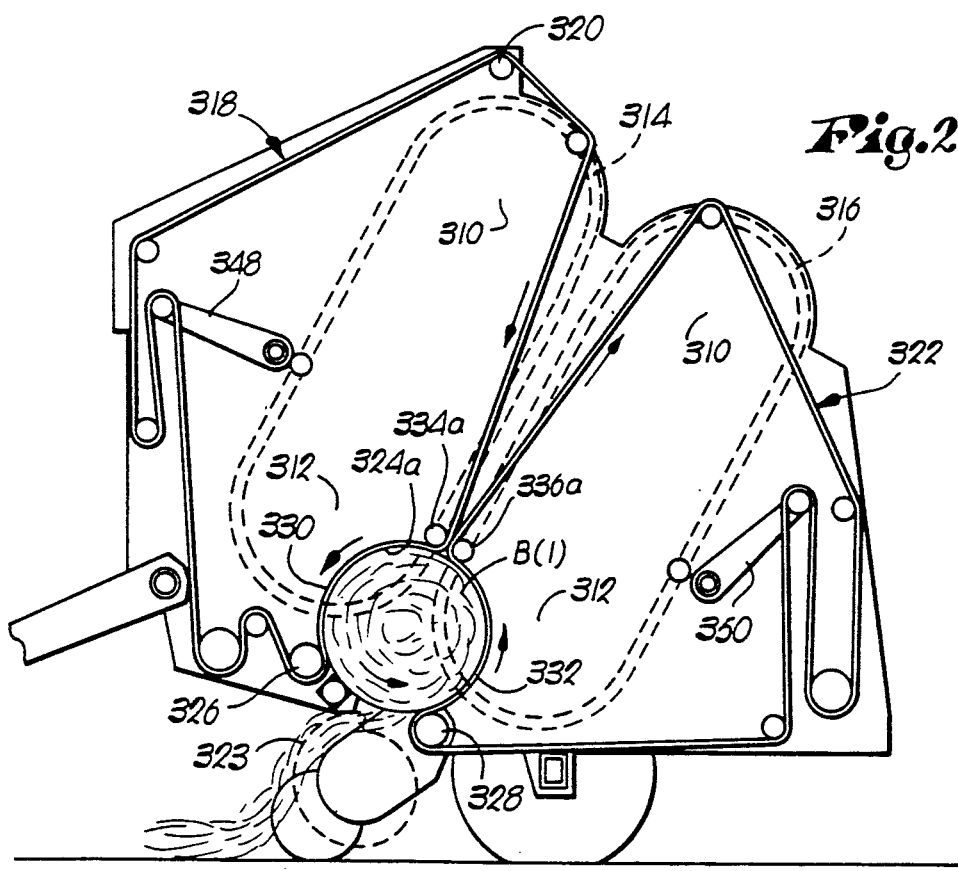

As the baler of the second embodiment moves across the field as illustrated in FIG. 23, the pickup 323 continuously lifts windrowed materials off the ground and introduces them into the baling chamber 324 through the bottom entrance to such chamber defined between the fore-and-aft spaced apart belt guide members 326 and 328. The newly introduced material is acted upon by the oppositely moving belt stretches 330 and 332 in the same manner as in the first embodiment such that a bale begins to form within the chamber 324 as illustrated in FIG. 24. The positioning rollers 334a and 336a yieldably resist upward movement at this time to provide down pressure against the forming bale.

Figure 25:
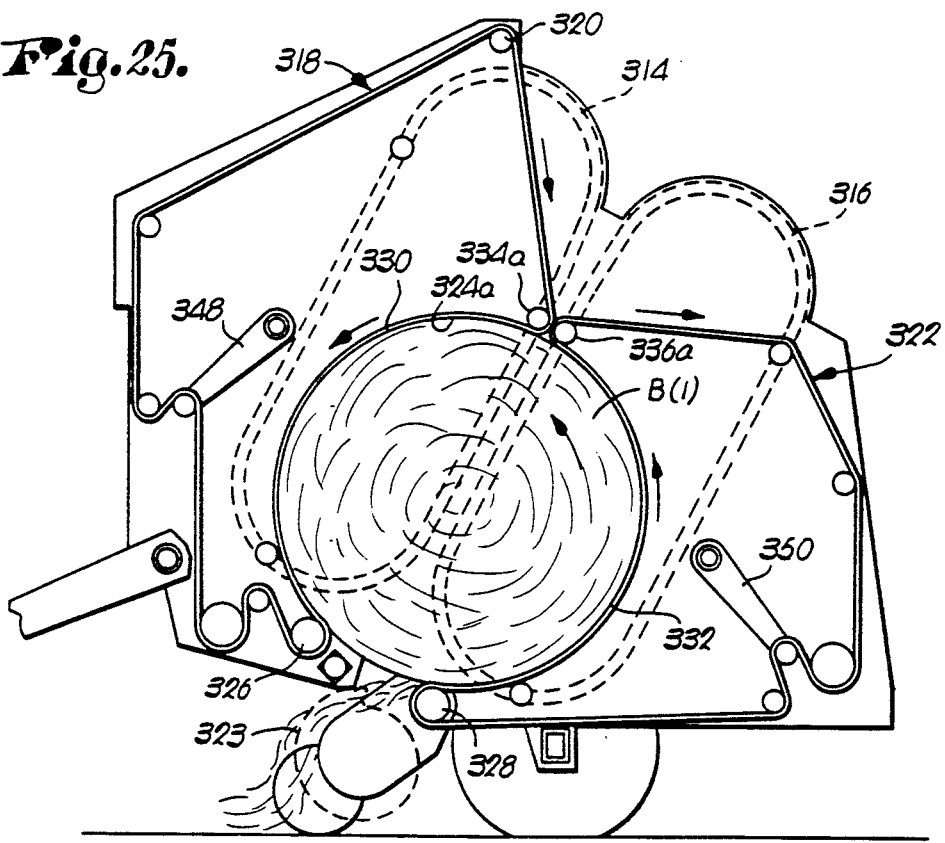

This action continues until the bale B(1) reaches the full size diameter illustrated in FIG. 25. At that point in time, or slightly thereafter as the bale is raised to the position illustrated in FIG. 26 and the two upper positioning rolls 334a and 336a start to separate, a suitable binding twine or other wrapping material maybe inserted down into the baling chamber between the rollers 334a and 336a to engage the bale and be coiled around the same as the bale continues to be rotated within the chamber. The specific dispensing apparatus for the twine or other wrapper may take a variety of forms and is preferably positioned in the same location as the dispenser 179 of the first embodiment illustrated in FIG. 1.

Figure 26:
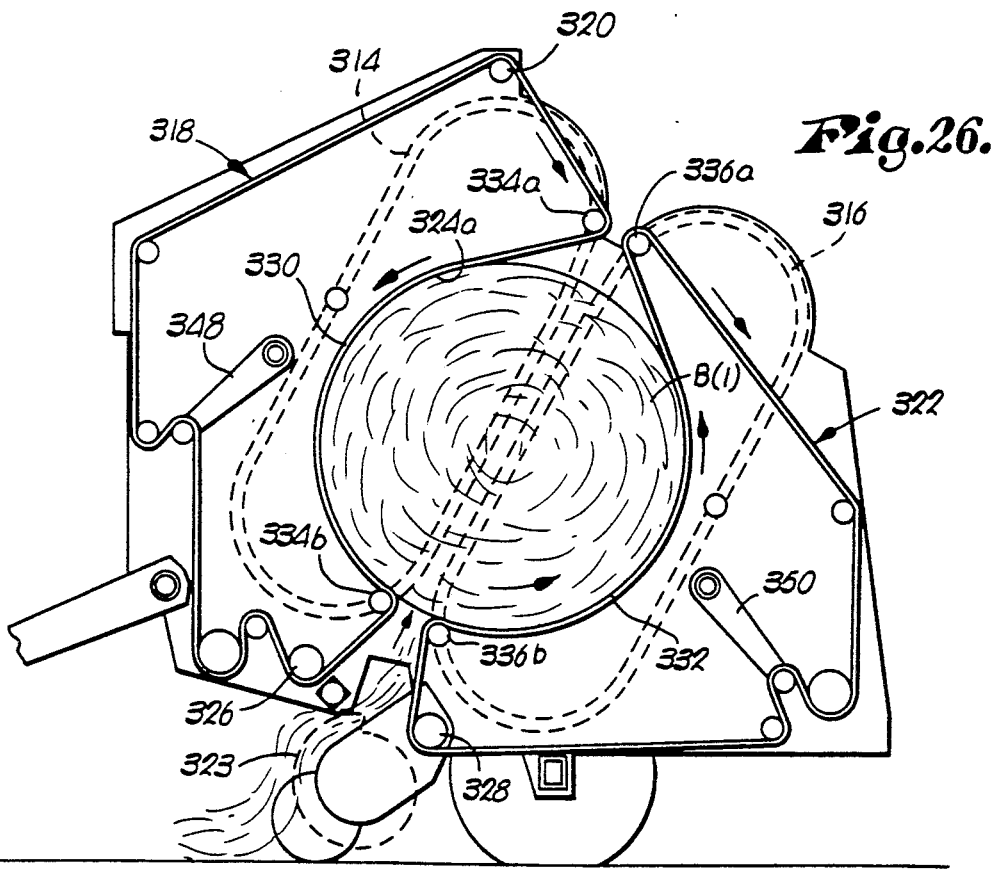

Essentially simultaneously with the start of bale wrapping, or slightly therebefore, the positioning chains 314 and 316 are operated to cause the next pair of positioning rollers 334b and 336b to start moving under the bale B(1) as illustrated in FIG. 26 such that the bale B(1) is caused to be lifted a short distance upwardly out of its initial lowered location within the baler. It is to be noted that the bale B(1) does not leave its baling chamber at this time; instead, the incoming positioning rollers 334b and 336b simply close off the previously opened lower entrance end of the changer so that both the bale B(1) and its chamber are displaced upwardly along the course of travel of the contiguous portions of the positioning chains 314 and 316. As mentioned above, such initial upward movement of the positioning rollers 334b and 336b also has the effect of moving the rollers 334a and 336a upwardly away from the bale B(1) and slightly away from one another as they commence movement about the upper arcuate ends of their respective closed loops of travel.

Figure 27:
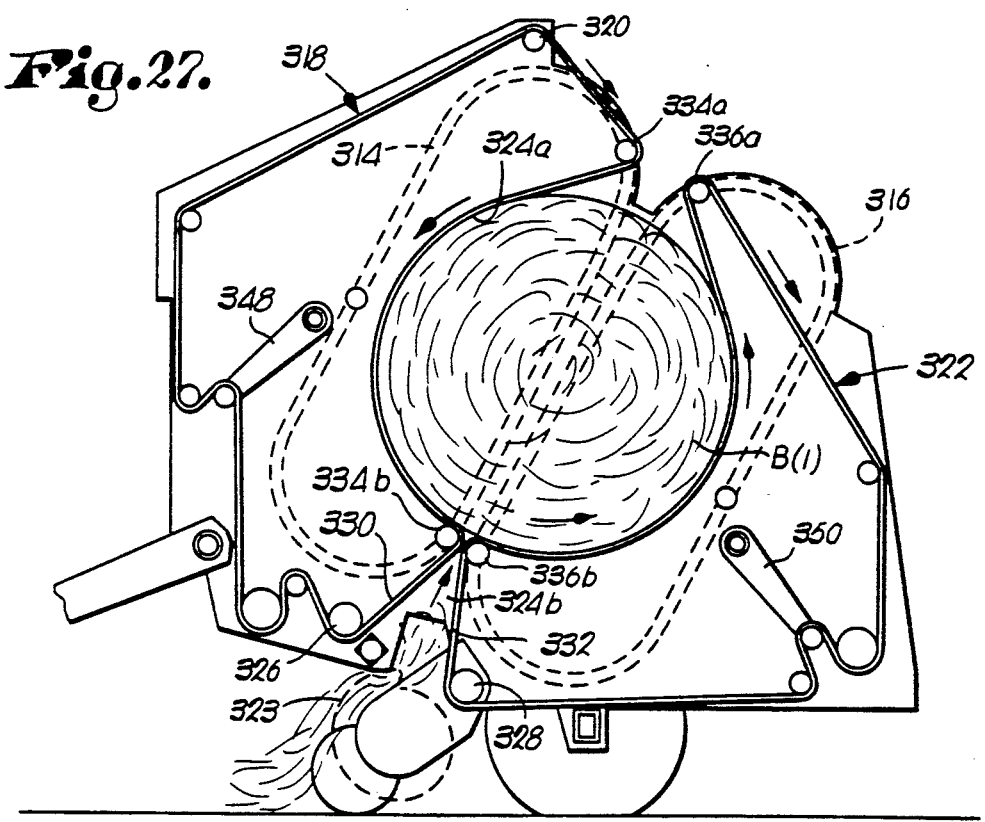

When the rollers 334b and 336b complete their movement toward one another as illustrated in FIG. 27, a new baling chamber 324b is presented at the old location of baling chamber 324a and with the same configuration. Rollers 334b and 336b thus not only serve at this time to close off the bottom of the baling chamber 324a in which the bale B(1) is located, but also to close off the top of the newly formed baling chamber 324b. Thus, new baling chamber 324b is ready to commence formation of the next succeeding bale, using the co-acting countermoving belt stretches 330 and 332 in the same manner as was true with respect to bale B(1).

Of course, during the time that bale B(1) is being raised between the positions of FIG. 25 and FIG. 27, fresh crop material continues to enter the baler beneath the bale B(1). Movement of the rollers 334b and 336b into their close proximal positions as illustrated in FIG. 27, is fairly swift, discouraging the continued delivery of freshly incoming materials to the bale B(1) by the upwardly moving rear belt stretch 332. Additionally, the flow separating fork 186 of the first embodiment may be utilized to assist in separating the bale B(1) from incoming crop material, if desired.

Figure 28:
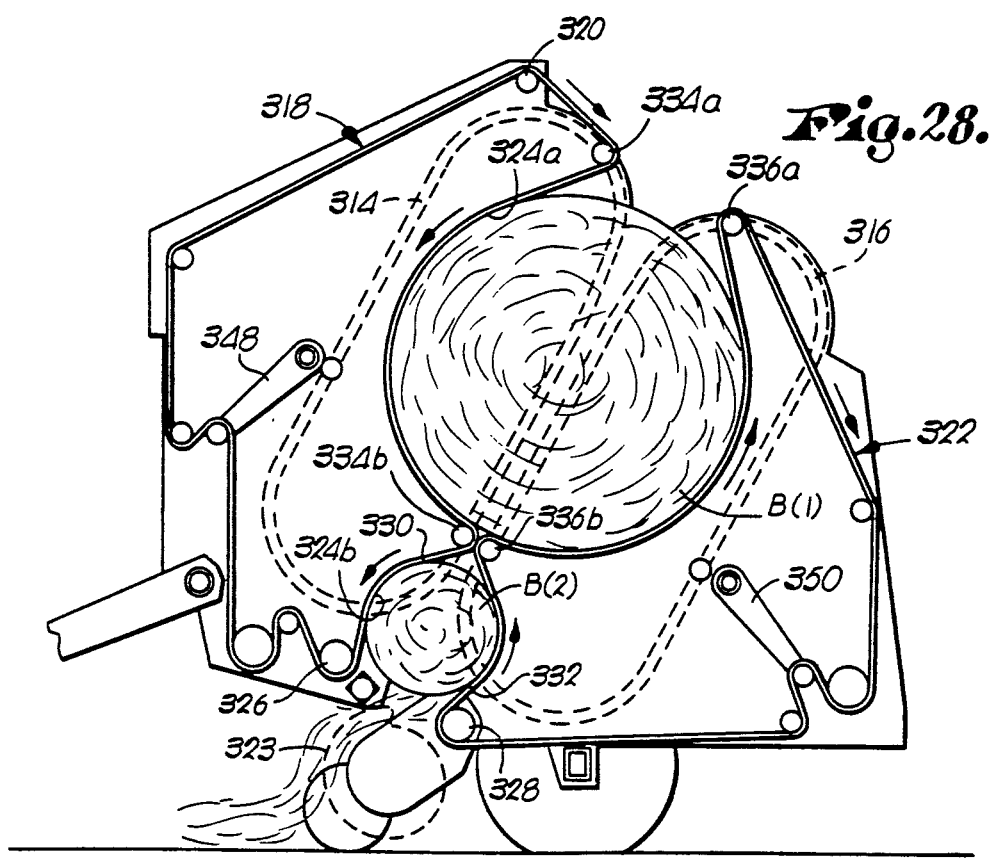

It is important to note that, as illustrated in FIG. 27, and continuing on into the condition of things illustrated in FIG. 28, the belt stretches 330 and 332 of the upper chamber 234a wrap the bale B(1) throughout almost its entire periphery during the time that the wrapping is being applied. Such essentially total envelopment of the bale B(1) by the upper belt stretches 330 and 332 helps keep the peripheral finish of the bale smooth and compacted until the bale B(1) can be completely wrapped with wrapping material. Without such complete envelopment of the bale, it has been found that there is some tendency for the periphery of the bale to be sloughed off as the bale continues to rotate and prior to covering or binding of the exposed portion with the wrapping material.

Figure 29:
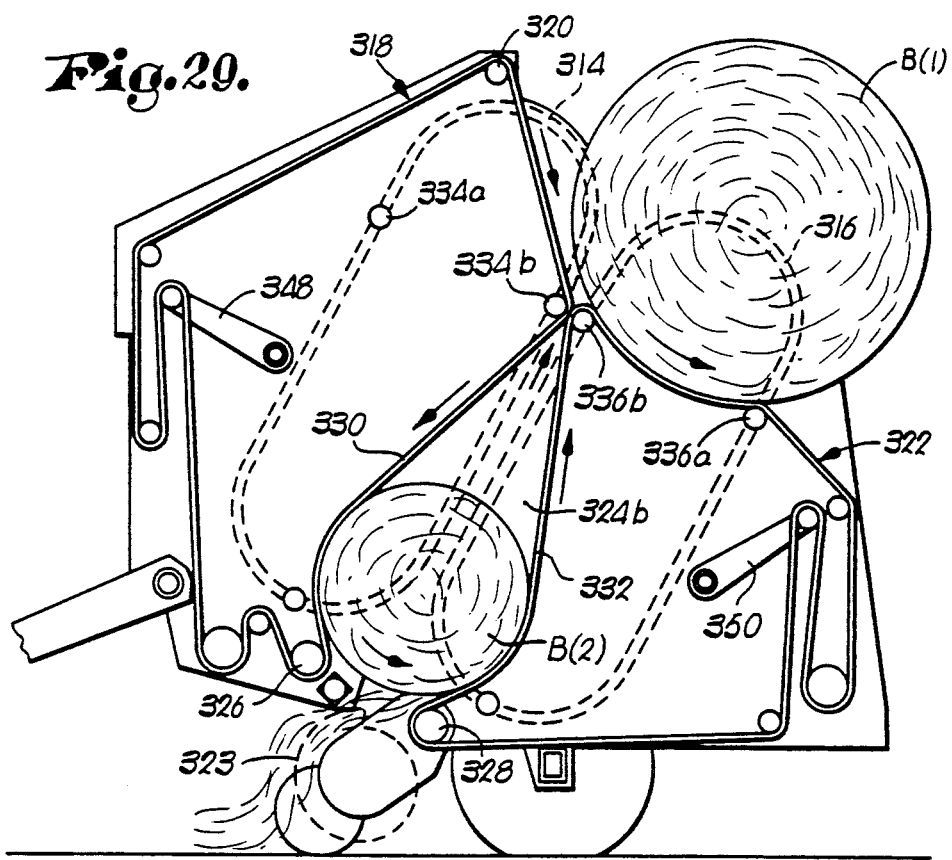
Figure 30:
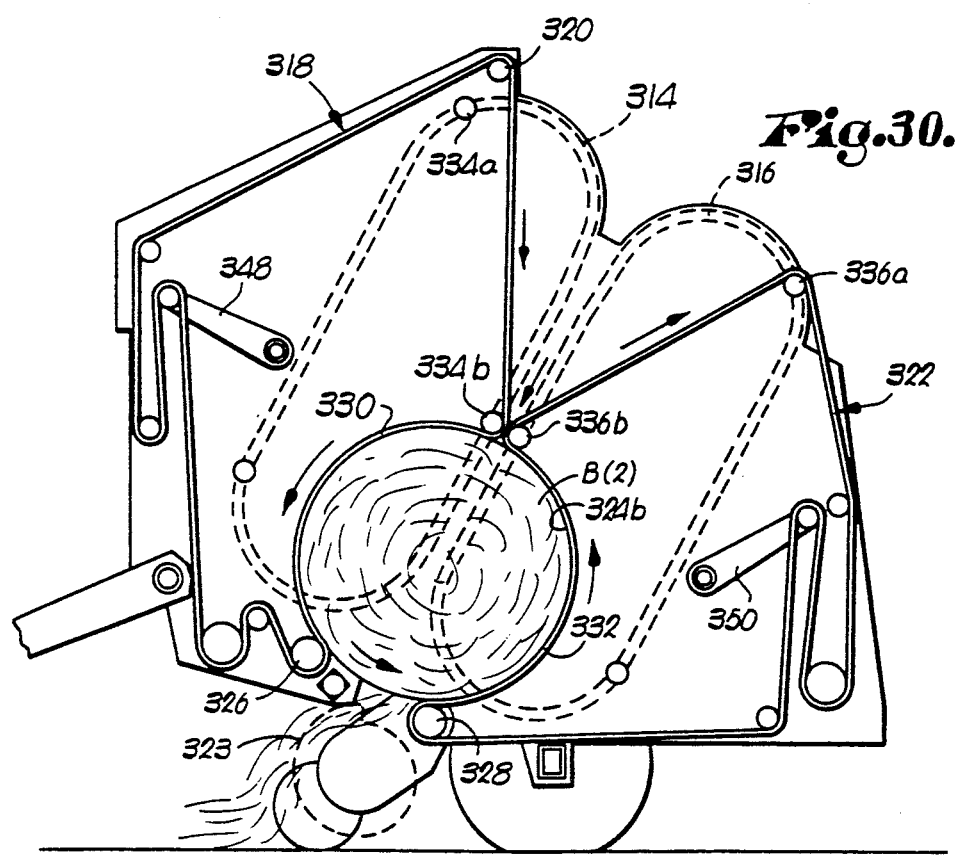

As the new bale B(2) begins to form, as illustrated in FIG. 28, the rollers 334b and 336b yieldably resist upward movement so as to apply compactive down pressure to the forming bale B(2). By the time the bale B(2) reaches the size illustrated in FIG. 29, the first bale B(1) will have been completely wrapped and ready for discharge. Accordingly, rather than continue to carry the bale B(1) within the baler until it is simply forced out by the growing new bale B(2), the positioning chains 314 and 316 are actuated to move the positioning rollers 334a and 336a upwardly away from bale B(2) so as to lift the bale B(1) to the discharge position. There, the rear belts 322 become formed into a downwardly and rearwardly inclined ramp which encourages the bale B(1) to simply roll out of the baler by gravity in a downward and rearward direction. Because the front belts 318 are held upwardly by the stationary roller 320 at this time, the stretch of the front belt 318 between stationary roller 320 and positioning roller 334a serves as a backstop to prevent the bale B(1) from settling in place on top of the rollers 334a and 336a. Thus, the bale B(1) is further encouraged to roll out of the baler. As soon as the bale B(1) is discharged, the positioning chains 314 and 316 are operated in a direction to bring the guide rollers 334a and 336a back down against the top of the bale B(2), as illustrated in FIG. 30. Although the top of the bale B(2) is thus not tightly wrapped by the belts for a short period of time during ejection of the previous bale as illustrated in FIG. 29, such limited exposure has not been found harmful to the overall bale quality, particularly considering the fact that such exposure of the bale B(2) occurs during mid-cycle of the baling operation rather than at the end of the cycle; the compactive force from overhead rollers 334a and 336a is reapplied shortly after removal so that any loose material is securely packed back into the bale B(2) in preparation for further growth of the bale.

Thereafter, formation of the bale B(2) continues the same manner as the bale B(1), until the full size condition is reached, whereupon the cycle is repeated.

HYDRAULIC CONTROL CIRCUIT OF THE SECOND EMBODIMENT

As with the first embodiment, the baler of the second embodiment requires hydraulic control of its tensioning cylinders for the belts 318 and 322 (see the tension cylinders 120 of the first embodiment) and of the positioning chains 314,316. The tensioning cylinders require constant hydraulic pressure throughout the entirety of each baling cycle, while the positioning chains 314,316 require yieldable hydraulic pressure in one direction during bale formation and greater hydraulic pressure in the opposite direction during bale lifting and ejection. Whereas the first embodiment employed a single variable displacement pump with both the tensioning cylinders and the hydraulic motor for the positioning chains connected in the same circuit with the single pump, the second embodiment utilizes a more simplified arrangement having a pair of hydraulic pumps with essentially separate circuits for the tensioning cylinders and the hydraulic motor.

In this regard, it will be seen from FIG. 22 that the tensioning cylinder 338 is coupled with a variable displacement pump 340 via a supply line 342. A pilot-operated check valve 344 is provided in line 342 so as to allow the admittance of pressurized fluid into the tensioning cylinder 338 from pump 340 but to prevent the escape of such fluid from cylinder 338 along line 342 when the pump 340 is turned off. Thus, pressure is held in tensioning cylinders constantly, not only throughout the baling cycle, but also when the pump 340 is turned off at the end of a day's operation.

It will be appreciated that as the bale grows within the baler, the piston 346 of cylinder 338 is progressively pushed into a more retracted condition within cylinder 338 by the belts 318 and 322 which must obtain progressively increasing amounts of "slack" from the slack takeup arms 348 and 350 as the peripheral dimension of the bale increases. Accordingly, oil must be allowed to escape from the cylinder 338 without decreasing the pressure level in the circuit. Such is accomplished by virtue of the pilot line 352 interconnecting circuit line 342 and the check valve 344 which causes the check valve 344 to be open any time the pump 340 is operating. Thus, pressure can be maintained throughout line 342 and within the cylinder 338, even though some oil must be forced out of cylinder 338 by the retracting piston 346, back through open check valve 344 and over the relief valve 354 which connects high pressure line 342 with a drain line 356 leading to tank 358. A normally closed drain valve 360 in drain line 356 above the check valve 344 permits oil to be completely drained from the tension cylinders 338 if desired, after the pump 340 has been turned off.

The reversible hydraulic motor 362 is coupled with the positioning chains 314 and 316 and is driven in either a clockwise or counter-clockwise direction, depending upon the particular point in the baling cycle under consideration, by a second variable displacement pump 364. The pump 364 is connected to the tank 358 for oil supply purposes via a supply line 366 and is maintained in a closed loop relationship with the reversible motor 362 via lines 368 and 370.

During bale formation, the positioning chains 314,316 are driven yieldably downwardly along their proximal stretches by the motor 362 so as to apply compactive pressure to the forming bale. The pump 364 is supplying oil to the motor 362 along line 368 at such time, attempting to drive the motor 362 in a direction to move the chains downwardly. However, the growing bale causes the chains to be moved upwardly so that the motor 362 is actually rotated in a reverse direction from that attempted by oil in the line 368, and the oil is allowed to make a closed loop through the motor 362 via line 368, a bypass line 372 interconnecting lines 368 and 370 above pump 364, a "kick down" valve 374 (hereinafter described in detail) in bypass line 372, a relief valve 376 in bypass line 372 (controlled by kick down valve 374), and the upper portion of line 370. The setting of adjustable relief valve 376 determines the amount of resistive pressure present in line 368 and against which the motor 362 reversely rotates as the bale grows within the baling chamber.

When the bale reaches full size, an operating cam coupled with the pump 364 but not illustrated herein reverses the direction of flow of the pump 364 so that high pressure oil now flows into line 370 from the pump 364 and line 368 becomes a return line. This provides the motor 362 with power to drive the positioning chains 314,316 in an upward direction along their proximal stretches such that the finished bale is lifted by the underlying positioning rollers 334,336 as previously described. A bypass line 378 interconnecting lines 368 and 370 below bypass line 372 is provided with an adjustable relief valve 380 whose setting determines whether high pressure oil in line 370 will actually drive the motor 362 in a bale lifting direction or be bypassed back to the pump 364 in a loop consisting of the line 370, bypass line 378, relief valve 380, and line 368. It will be appreciated that the unillustrated cam coupled with the pump 364 determines those points in the operating cycle of the baler when the positioning rollers 334,336 apply compactive down pressure to the forming bale, when they lift the formed bale and its chamber to a slightly raised position for wrapping, and when they lift the completely wrapped bale up and out of the baler for discharge.

When the bale is being lifted for discharge purposes, high pressure oil is flowing through the line 370 to motor 362 as previously described. The culmination of such action is illustrated in FIG. 29 wherein the rollers 334*a* and 336*a* are in their temporarily raised, bale discharging positions. The operating cam thereafter reverses the flow out of pump 364 so that line 368 becomes the high pressure line, driving motor 362 in the reverse direction to bring the rollers 334*a* and 336*a* back down against the top of the bale B(2) as illustrated in FIG. 30. When the rollers 334*a* and 336*a* engage the top of the bale B(2), back pressure within the line 368 is increased to such a level that the kick down valve 374 is opened, allowing oil to be by-passed through line 372 and relief valve 376 in the previously described manner. Thereafter, although pump 364 continues to attempt to deliver oil to the motor 362 via line 368, the motor 362 is rotated reversely against the pressure in line 368 by the upwardly growing bale as previously explained.

The kick down valve 374 is of such design that it opens line 372 to relief valve 376 at a relatively high pressure, and once so opened, remains open so long as it has at least some flow passing therethrough, even if such flow is at a relatively low pressure as is the case during yieldable retarding of the bale growth by the positioning rollers 334 and 336. It is possible, however, that the pressure in bypass line 372 may sometimes temporarily fall below that required to open relief valve 376 during the application of retarding pressure by rollers 334 and 336, thus stopping flow through the kick down valve 374 and allowing it to re-close. To prevent this from happening, a line 382 connects with bypass line 372 between kick down valve 374 and relief valve 376 and leads to line 370 on the upstream side of the motor 362 when the latter is being reversely rotated by the growing bale. Line 382 is provided with a restricted orifice 384 which is always open to provide flow through kick down valve 374, even though relief valve 376 may be closed due to the pressure in bypass line 372 being lower than the relief setting of relief valve 376. The presence of restricted orifice 384 in line 382 assures that, under normal circumstances, bypassing oil does not have a constantly available zero pressure escape through line 382 to line 370, but instead can only escape at a high volume rate through relief valve 376 when pressure in bypass line 372 exceeds the relief setting of relief valve 376.

The kick down valve 374 is of such design that it resets for closing bypass line 372 whenever pressure in the bypass line 372 drops to zero, i.e., when the circuit changes from its down pressure-applying forming mode to its lifting mode in which line 370 becomes the high pressure line. A suitable kick down valve to perform the desired function of kick down valve 374 may be obtained from Sun Hydraulics Corporation of Sarasota, Florida, under the model designation "SQDB-FAN".

EMBODIMENT OF FIGS. 31-42

The continuous baler of FIGS. 31-42 retains the "moving pocket" concepts of the first two embodiments in which each new bale is confined within its own chamber from start to finish as the chamber itself moves with the bale from one location to another in the machine. However, the embodiment of FIGS. 31-42 presents certain alternatives to the constructions of the first two embodiments.

The most notable difference between the third embodiment and the first two embodiments resides in the positioning mechanism for the web stretches of the machine. In this respect, while the first two embodiments utilize a single control mechanism that includes positioning rollers for both the lower part of the machine and the upper portion thereof, the third embodiment utilizes separate upper and lower control mechanisms, each with their own sets of positioning rollers, to accomplish the desired functions. Although a single pair of belt stretches is still used in the third embodiment and each bale continues to be confined within its own chamber or pocket that simply moves from one location to another in the machine without releasing the bale until it is ready for discharge, separate upper and lower control mechanisms operate on the single pair of belt stretches to form, elevate, confine the bale during wrapping, and ultimately discharge the bale.

The baler 400 includes a mobile chassis 402 that is provided with a pair of opposite left and right sides 404 and 406, respectively. The chassis 402 is supported by a pair of ground wheels 408 and 410 which make the machine mobile, and a fore-and-aft tongue 411 at the front of the chassis 402 adapts the machine to be coupled with a towing vehicle (not shown) for movement across a field. A pickup 412 suspended from the chassis 402 in front of the wheels 408,410 lifts windrowed crop material off the field as the machine advances and feeds it up into the baler for further processing.

The left and right sides 404,406 of the baler are defined in part by a plurality of structural members broadly denoted by the numeral 414 on each side and by left and right side walls 416,418, respectively, supported by the structural members 414. The two side walls 416,418 thus present a space above the pickup 412 in which crop materials can be formed into bales and further processed before being discharged from the machine.

Figure 37:
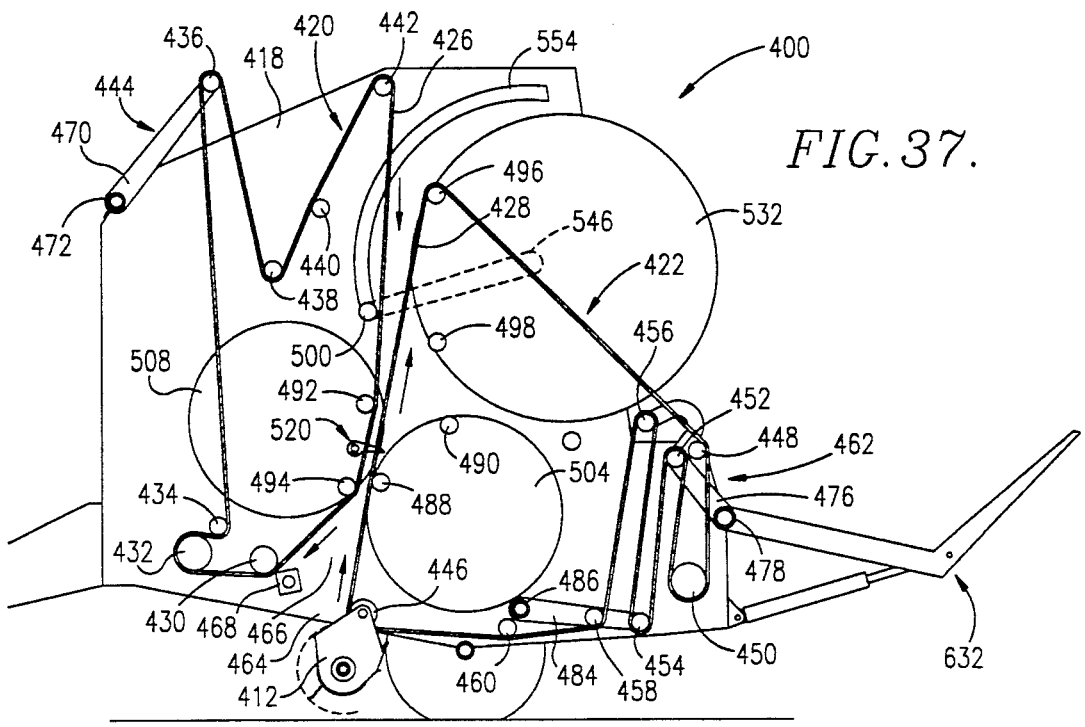
FIGS. 37-42 are schematic illustrations of the operating cycle of the baler of FIG. 31.

As perhaps shown best in FIG. 37, the space between the two side walls 416,418 is generally occupied by two front and rear sets of flexible web means denoted broadly by the numerals 420 and 422, respectively. Each web means 420,422 includes a number of endless, flexible belts, such as the belts 424 shown in FIGS. 34 and 35, which are spaced apart laterally across the width of the baler between the opposite side Walls 416 and 418. The two sets of web means 420 and 422 are so disposed as to present a pair of generally upright web stretches 426 and 428 presented by the front and rear belt sets 420,422 at the approximate fore-and-aft midpoint of the machine generally above the pickup 412, the front belt stretch 426 moving downwardly during operation and the rear belt stretch 428 moving upwardly during operation, as will subsequently be seen.

The front belts 420 are looped around a number of guide rollers which support the individual belts 424 for linear movement during operation. Such guide rollers include a lower roller 430, a lower front roller 432, a lower idler roller 434, an upper idler roller 436, a pair of mid-height idlers 438 and 440, and an uppermost roller 442. The roller 436 forms part of a tension control and slack takeup assembly broadly denoted by the numeral 444, as will subsequently be explained. Similar guide rollers are provided for the rear belts 422. In this respect, it will be seen that each of the belts 424 of the rear set 422 is looped under a lower roller 446, over a rearmost roller 448, under a lower rear roller 450, thence over a roller 452, under a roller 454, over a roller 456, under a roller 458, and finally under a roller 460. The rollers 448-458 are associated with tensioning and slack takeup means broadly denoted by the number 462.

The fore-and-aft space between the two lowermost rollers 430 and 446 serves to define an open throat entrance 464 to the area between the front and rear belt sets 420,422. In the illustrated embodiment, the entrance 464 leads to an initially generally vertically disposed bale-forming chamber denoted by the number 466 which is somewhat triangularly formed, as illustrated in FIG. 37, with a broad base at the entrance 464 and an apex spaced a distance above the entrance 464. A transverse starter roller 468 may be utilized at the entrance 464 to assist in initial turning of the core of the bale, as will subsequently be seen. Although the illustrated embodiment shows the pickup 412 feeding materials directly to the chamber 466 without the assistance of additional feeders such as, for example, a rotating, ribbed drum or the like, it will be understood that the principles of the present invention are not limited to having the pickup 412 as the sole means of presenting and feeding the picked up materials to and through the entrance 464 into the chamber 466.

Figure 31:
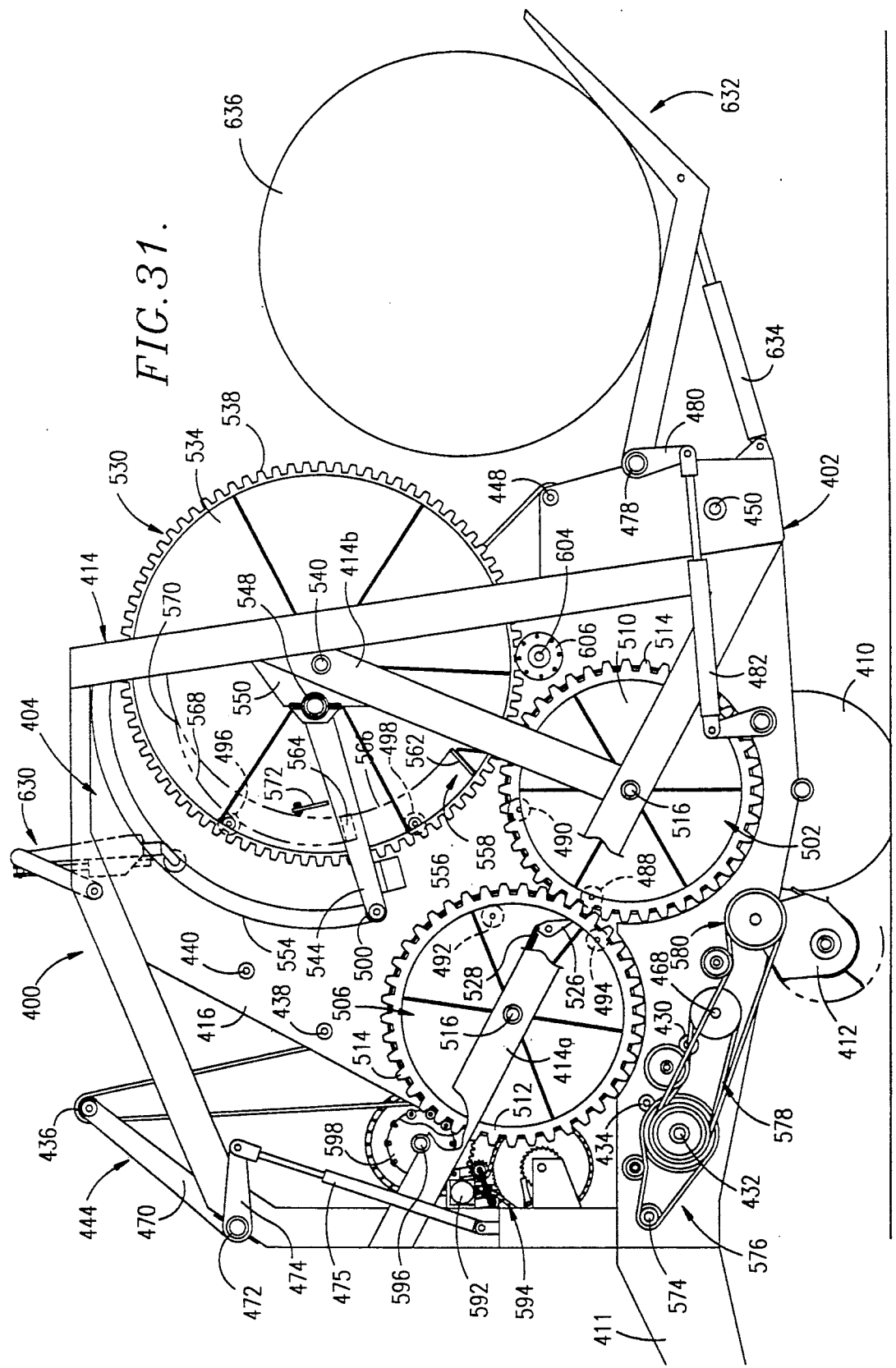
FIG. 31 is a left side elevational view of a third embodiment of the invention.

The take up and tensioning control mechanism 444 includes a pair of arms 470 which support opposite ends of the roller 436 and which are swingably mounted on the front of the structural members 414 via a transverse torque tube 472. As illustrated in FIG. 31, one end of the torque tube 472 has a crank 474 that is operably coupled with the rod end of a single acting hydraulic tension cylinder 475.

The rear tension and takeup mechanism 462 includes a pair of laterally spaced apart arms 476 (FIGS. 37-42 only) which are fixed to a transverse, rotatable torque tube 478 at the rear of the machine. As shown in FIG. 31, the torque tube 478 has a downwardly extending crank 480 at its left end which is operably coupled with the rod end of a generally fore-and-aft extending, single acting hydraulic cylinder 482 supplying tension to the assembly 462. The swingable arms 476 carry the two rollers 452 and 456. An additional pair of arms 484 along the bottom of the machine and forward of the arms 476 are coupled with a transverse torque tube 486 rotatably secured to the opposite sides of the machine. The two arms 484 carry the rollers 458 and 454 for taking up an additional amount of the slack of the rear belt set 422.

A number of positioning rollers are provided for controlling the configuration of the belt stretches 426,428, for lifting the bale from the lower part of the baler to the upper portion thereof, for controlling the lifted bale while it is in the upper portion of the machine, and for discharging the completed bale. As shown best in FIGS. 37-42, these rollers include a pair of lower rear rollers 488 and 490, a pair of lower front rollers 492 and 494, a pair of upper rear rollers 496 and 498, and a single, upper front roller 500.

Dealing first with the lower rear rollers 488 and 490, it will be seen that these rollers are mounted upon a pair of support discs 502 and 504, mounted rotatably on the left and right sides 404 and 406, respectively of the baler. Each of the support discs 502,504 is journalled to an upwardly and forwardly extending structural member designated as 414a in the drawings. The two rollers 488 and 490 are spaced apart approximately 60° on the circumferential periphery of the discs 502 and 504.

The two rollers 492 and 494 are supported by a second pair of rotatable supporting discs designated by the numerals 506 and 508 on the left and right sides of the baler 404,406, respectively. The discs 506 and 508 are also rotatably journalled by the upwardly inclined structural members 414a on opposite sides of the baler, the discs 506,508 being disposed slightly upwardly and forwardly from the discs 502 and 504. The rollers 492 and 494 are spaced apart approximately 60° on the circumferential periphery of the discs 506 and 508.

The discs 502,504 and 506,508 are virtually identical in construction to one another. Thus, using the discs 506 and 508 as exemplary constructions illustrated in FIG. 35, it will be understood that each of the discs is generally hat shaped, having a recessed, innermost, back wall 510 that is designed to be flush with the corresponding side wall 416 or 418, as the case may be. A circumferential rim 512 is fixed to the back wall 510 and projects outwardly therefrom beyond the plane of the proximal side wall 416 or 418 of the baler. A 360° series of radially outwardly projecting teeth 514 are fixed to the rim 512 at its outermost extent, and the teeth 514 of the adjacent discs 502,506 and 504,508 intermesh so that all of the discs 502,506,504,508 rotate simultaneously and in timed relationship to one another. Each of the discs 502,504,506, and 508 has a stub axle 516 fixed to and projecting outwardly from the center of the back wall 510 and rotatably received within a bearing assembly 518 carried by the corresponding structural members 414a.

The lower front discs 506 and 508 are so positioned that the rollers 492 and 494 are disposed on the front side of the web stretches 426 and 428, bearing against the inside or front face of the stretch 426 during certain portions of the operating cycle of the baler. On the other hand, the lower rear discs 502 and 504 are so positioned that the rollers 488 and 490 are disposed on the rear side of the web stretches 426,428, bearing against the inside or rear face of the stretches 428 during portions of the operating cycle of the machine.

In addition to the rollers 492 and 494, the two front discs 506 and 508 carry a transverse finger assembly broadly denoted by the numeral 520 for use in maintaining separation of hay coming into the machine from the bale that is being lifted into its upper position within the baler during that transition period. Such finger assembly 520 includes a cross tube 522 that is mounted for rocking movement about a transverse axis that is eccentrically disposed with respect to the axis of rotation of the disc 506 and 508, such axis being located generally between the two rollers 492 and 494. The cross tube 522 has a plurality of upwardly arched fingers 524 secured thereto at spaced locations along the latter so as to be capable of slipping between the adjacent belts 424 of the web stretches 426 and 428 when the discs 506 and 508 are in certain of their rotative positions. On the left side 404 of the baler as illustrated in FIGS. 31 and 35, the cross tube 522 has a bell crank 526 fixed thereto just outboard of the back wall 510, such bell crank 526 being coupled at one end with a tension spring 528 which yieldably biases the opposite end of the bell crank 526 toward engagement with the proximal inner face of the rim 512 so as to limit rotation of the finger assembly 520 in a counter-clockwise direction viewing FIG. 31 and FIGS. 37–42.

The upper positioning rollers 496 and 498 are mounted on a pair of left and right, large support discs 530 and 532, respectively, on the opposite sides 404,406 of the baler. The two large discs 530 and 532 are rotatably supported by upwardly and rearwardly angled members 414b of the group of structural members associated with the chassis 402. As illustrated in FIG. 34 with respect to the disc 532, each of the discs 530 and 532 is generally hat shaped, like the lower discs 502–508, having a circular, recessed back wall 534 that is disposed in the same plane as and is thus flush with the corresponding side wall 416 or 418. A continuous, circumferential rim 536 projects laterally outwardly from the face of the back wall 534, and an endless series of gear teeth 538 are affixed to the rim 536 at its outboardmost extent, projecting radially outwardly from the axis of rotation of the disc 532. A stub shaft 540 projects outwardly from the center of the back wall 534 and is journalled by a bearing assembly 542 carried by the structural member 414b.

The upper single positioning roller 500 is supported by a pair of generally fore-and-aft extending swing arms 544 and 546, the left swing arm 544 being swingably mounted to the left side 404 of the baler and the right swing arm 546 being swingably mounted to the right side 406 of the baler. A pivot 548 for each of the swing arms 544,546, respectively, swingably attaches the same to a gusset 550 secured to the corresponding upwardly and rearwardly inclined structural members 414b. At their outer ends, the swing arms 544 and 546 are provided with transverse pintles 552 that project through arcuate slots 554 in the respective side walls 416 and 418 and attach to opposite ends of the positioning roller 500 for adapting the latter to swing up and down with the swing arms 544 and 546 about a transverse axis located slightly forwardly of the axes of rotation of the upper discs 530,532 defined by their respective stub shafts 540. A pair of stops 556 project outwardly from opposite side walls 416,418 as show in FIGS. 31, 32, and 33, for engageably supporting the swing arms 544,546 when the roller 500 is at the lower end of the slots 554.

The two swing arms 544 and 546 are swingable independently of the upper discs 530 and 532, yet move with such discs 530,532 during a portion of the cycle of rotation of the latter. In this respect, each side of the baler is provided with a lost motion coupling between the corresponding disc 530 and arm 544 or disc 532 and arm 546, as the case may be, such lost motion couplings being broadly denoted by the numeral 558 for the left side 404 of the machine, and by the numeral 560 for the right side 406 of the machine. Each of the lost motion couplings 558,560 includes a shoulder 562 projecting outwardly from the back wall 534 adjacent the rim 536 and slightly below the roller 498. Further, each coupling 558,560 includes a pickup block 564 on the inside surface of each swing arm 554 and 546, respectively, at such a location as to be within the path of travel of the shoulder 562 as the latter moves upwardly from its home position of FIGS. 31–34 while the swing arms 544,546 are in their lowered positions. As illustrated in FIG. 31, however, it will be seen that the radially innermost extremity of the shoulder 562 moves in an arcuate path of travel 566 that is concentric about the axis of stub shafts 540, while the radially outer extremity of the block 564 moves about an arcuate path of travel 568 that is concentric about the axis of pivots 548. Consequently, although each shoulder 562 can support its corresponding block 564 for a portion of the upward swinging of the swing arms 544,546, when the two paths of travel 566 and 568 intersect at point 570, the block 564 will have moved so far radially inwardly relative to the shoulder 562 that block 564 slips off the shoulder 562, allowing the swing arms 544,546 to swing back down by gravity to their initial lowered positions against the stops 556. A one-way, spring loaded dog 572 projecting outwardly from the back wall 534 of each upper disc 530,532 is disposed to captively overlie the corresponding swing arm 544 or 546 when such components are in their home positions of FIGS. 31, 32, and 33, thus preventing the swing arms 544 and 546 from rising upwardly relative to the discs 530,532, which would otherwise permit the positioning roller 500 to swing up without corresponding upward movement of the positioning rolls 496,498. However, the discs 530 and 530 can rotate in a clockwise position, viewing FIG. 31, relative to the swing arms 544 and 546, and during each 360° revolution of the discs 530,532, the dogs 572 ultimately come around and move underneath the swing arms 544,546 as the dogs 572 are depressed inwardly against their springs to permit such movement. Once passing upwardly to the opposite upper side of the swing arms 544,546, the dogs 572 flip out to once again resume their overlying, retaining position with respect to the swing arms 544 and 546.

Driving power for the various components of the baler is supplied through a combination of mechanical and hydraulic sources. In this respect, it is to be understood that power is conveyed from the towing vehicle to the baler in the usual way through a fore-and-aft drive shaft (not shown) along the tongue 412. Such input drive shaft leads to a suitable right angle gear box (not shown) adjacent the front of the machine, where a cross-shaft designated by the numeral 574 in FIGS. 31, 32, and 33 extends across the front of the machine and to the opposite left and right sides 404,406 thereof. On the left side of the machine, the cross-shaft 574 is coupled with a chain and sprocket assembly denoted by the numeral 576 which supplies driving power to the roll 432 of the front belt set 426. Roll 432 is the only driven roller in the front belt set 426. The chain and sprocket assembly 576 also supplies power to the starter roll 468 via a belt and pulley assembly 578 and to the pickup 412 via a second belt and pulley assembly 580.

On the opposite side of the machine, i.e., the right side 406, the cross-shaft 547 leads to a right angle gear box 582 having a fore-and-aft extending output shaft 584 that leads to a rearwardly located, second right angle gear box 586. The rear gear box 586 is drivingly coupled with the roller 450 at the rear of the machine so as to provide driving power for the rear belt set 422.

The discs 502,504,506,508 and 530,532 are hydraulically driven. In this respect, the main drive shaft to the baler coming in along the tongue 411 is operably coupled with a suitable hydraulic pump carried by the chassis 402 and shown only schematically in FIG. 36 as pump 588. The pump 588 also has its own reservoir 590 on the baler, likewise shown only schematically in FIG. 36. The pump 588 in turn supplies oil under pressure to a hydraulic motor 592 for the lower discs 502,504 and 506,508, as illustrated at the front of the machine in FIGS. 31, 32, and 33, and as shown schematically in FIG. 36. The output shaft of the hydraulic motor 592 is coupled with a gear reduction chain and sprocket assembly 594 having a final output shaft 596 extending across the front of the baler. At its opposite ends, the shaft 596 carries a pair of roller gears 598 (only one being shown—see FIG. 31) which roller gears 598 are meshed with the teeth 514 of the respective lower front support discs 506 and 508. Thus, the single hydraulic motor 592 drives both of the lower front discs 506 and 508, which in turn drive their respective lower rear discs 502 and 504, due to the intermeshing relationship between the gear teeth 512 of such front and rear discs.

Figure 32:
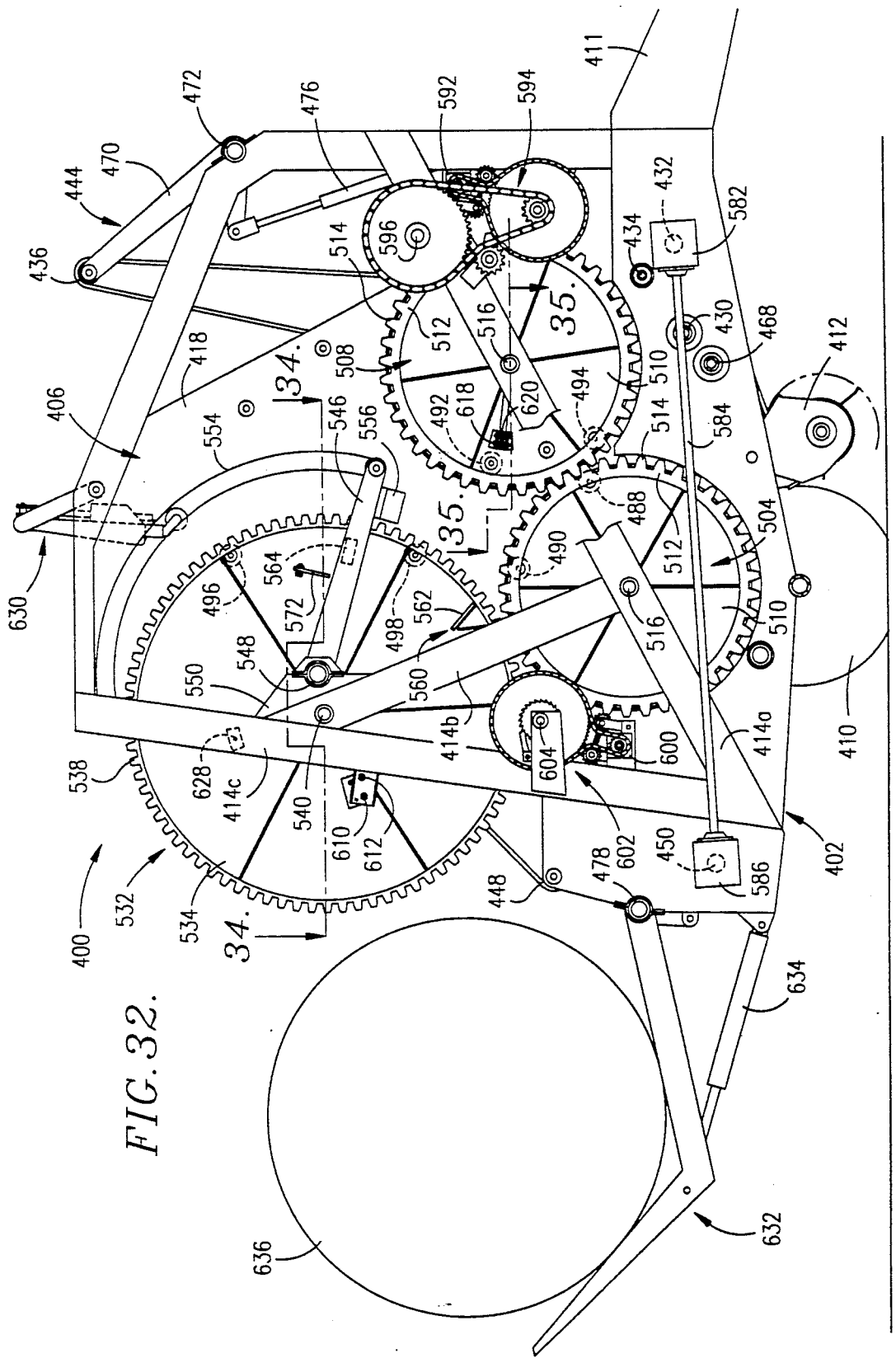
FIG. 32 is a right side elevational view of the embodiment of FIG. 31.
Figure 33:
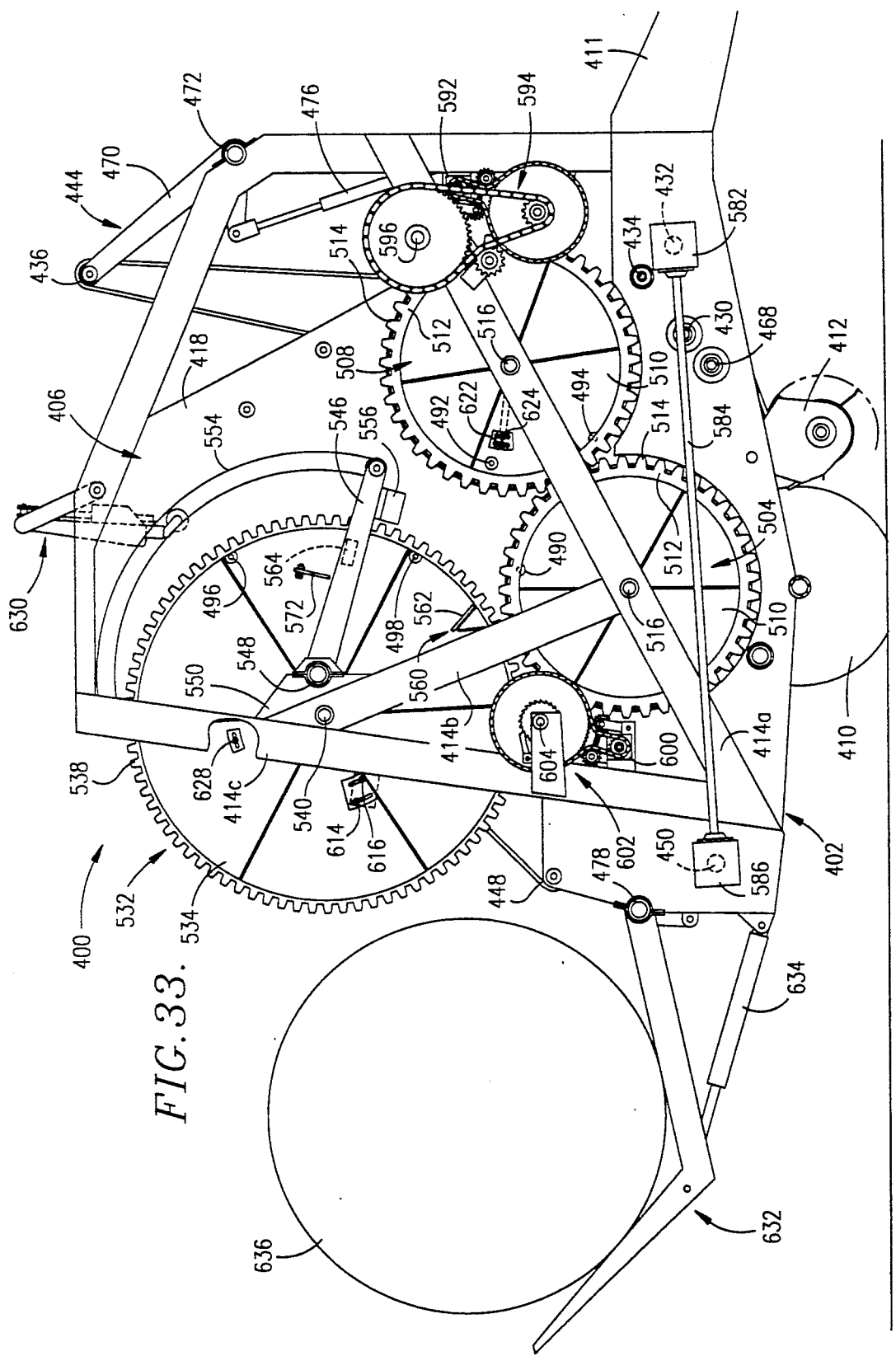
FIG. 33 is a right side elevational view of the embodiment of FIG. 31 similar to FIG. 32, but with parts broken away to reveal details of construction.
Figure 36:
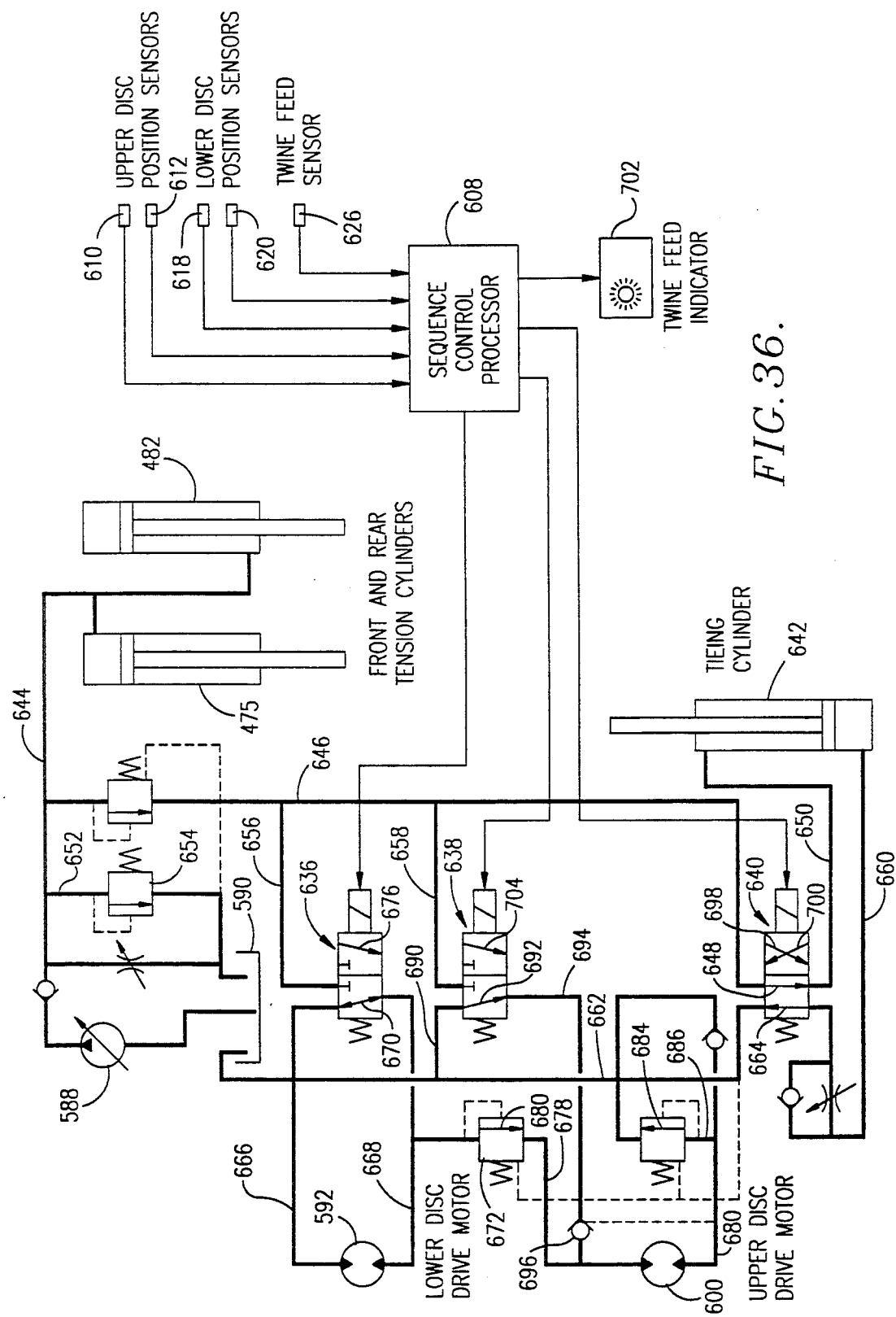
FIG. 36 is a schematic diagram of the hydraulic circuit for the belt position control mechanism of the baler of FIG. 31 and the interface of such hydraulic circuit with other controls of the machine.

The hydraulic pump 588 also supplies oil under pressure to a second hydraulic motor for the upper discs 530 and 532, such motor being denoted by the numeral 600 and being located on the right side 406 of the machine at the rear thereof, as illustrated in FIGS. 32 and 33 and also on the schematic diagram of FIG. 36. A chain and sprocket gear reduction assembly 602 is operably coupled with the output shaft of the hydraulic motor 600 and has a final output shaft 604 that extends across the rear of the machine. The shaft 604 has at its opposite ends a pair of roller gears 606 (only one being shown—see FIG. 31), which roller gears 606 are meshed with their respective upper discs 530 and 532 for driving the latter.

For controlling operation of the pumps 592 and 600, the baler is provided with an electronic control system which includes a sequence control processor 608 shown only in the schematic diagram of FIG. 36, and a number of sensors which are electrically connected to the processor 608. Such sensors include a pair of sensors 610 and 612 for the upper discs, mounted on the upright structural member 414c on the right side of the machine, as shown in FIGS. 32 and 34, and also in the schematic diagram of FIG. 36. The sensors 610 and 612 are positioned for activation by a pair of magnets 614 and 616 carried by the right upper disc 532 as illustrated in FIGS. 33 and 34. For controlling the operation of the hydraulic motor 592 for the lower discs 502,504 and 506,508, a pair of position sensors 618 and 620 are mounted on the right side of the machine on the structural member 414a, as illustrated in FIGS. 32 and 35, as well as schematically in FIG. 36. The sensors 618 and 620 are disposed to be actuated by a pair of magnets 622 and 624 affixed to the lower front disc 508, as illustrated in FIGS. 33 and 35. Another magnet 628 on the exterior of the disc 532 approximately 90° from the magnets 614 and 616 also actuates the appropriate sensors 610 or 612. A twine feed sensor for mechanism yet-to-be described is denoted by the numeral 626 in the schematic diagram of FIG. 36 and is physically attached to the chassis 402 in such a position as to detect the dispensing of twine during the wrapping cycle of the machine in order that the swinging of twine dispensing tubes of the wrapping mechanism can be controlled.

If desired, the baler may be provided with mechanism for tying or wrapping twine or plastic material around each bale after it has been fully formed and before it is discharged from the baler. A suitable tying mechanism for accomplishing this function is denoted by the numeral 630 in the drawings and is located at the top of the baler. The dispensing mechanism 630 is only schematically illustrated, since it may take a variety of forms within the principles of the present invention. A mechanism for dispensing twine or other wrapper in the appropriate manner is within the skill of those ordinarily skilled in this art.

The machine may also be provided with a one bale accumulating attachment if desired. In this respect, the preferred embodiment as illustrated shows the use of a generally L-shaped retaining tail gate 632 that is swingable between a raised, holding position, as illustrated in the drawings, and a lowered, releasing position (not illustrated) in which a previously held bale is permitted to gravitationally roll of the tailgate 632. A hydraulic cylinder 634 connected between the chassis 402 and the tailgate 632 effects raising and lowering of the latter.

OPERATION OF THE EMBODIMENT OF FIGS. 31-42

The operation of the third embodiment is most easily understood by referring primarily to the illustrations in FIGS. 37-42 showing various stages in the baling cycle. As the baler 400 moves across the field in an initially empty condition, the various components assume their home positions of FIG. 37. This condition of the various operating components, as shown in FIG. 37, also corresponds to the condition of the components as illustrated in FIGS. 31-33 at this time, although such latter figures also show a bale 636 carried by the retaining tailgate 632.

Figure 38:
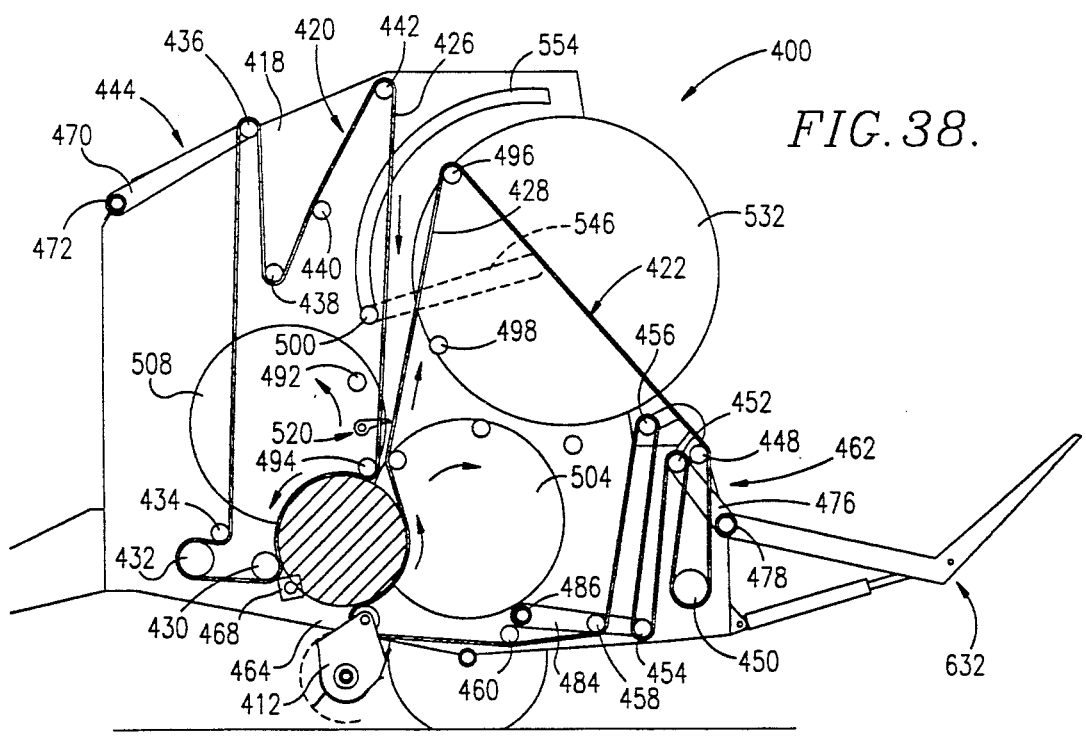

As the baler 400 moves forward, the front belts 420 and the rear belts 422 are driven in such a manner that the front upright stretch 426 is moving downwardly, as illustrated in FIG. 37, while the rear upright stretch 428 is moving upwardly. Crop materials encountered by the pickup 412 are lifted off the ground and fed into the baling chamber 466 via the open throat entrance 464. As the materials move into the chamber 466, they encounter the upwardly moving forces imparted by the rear stretch 428 and the downwardly and forwardly moving forces supplied by the front stretch 426 so as to impart a forward tumbling and coiling action to the materials. This causes them to begin assuming the shape of a cylindrical bale core, as illustrated in FIG. 38.

During this initial formation of the bale core, the positioning rollers 494 and 488 keep the stretches 426 and 428 close together at the top of the chamber 466 so as to close the chamber 466 at that location. This also has the effect of causing the incoming hay to turn downwardly and coil upon itself during starting of the core. Since the belt stretches 426 and 428 are under tension from the tension control assemblies 444 and 462, compactive force is applied to the forming bale, not only at this initial stage, but also throughout the forming process.

As the baler continues to move forward and crop material continues to be introduced into the chamber 466, the bale progressively enlarges and pushes upwardly against the positioning rollers 494 and 488. Additional slack is also paid out by the control assemblies 444 and 462 as needed to accommodate the enlarging circumference of the forming bale. When the upward force exerted by the forming bale is strong enough, the positioning rollers 494 and 488 will be displaced upwardly, causing the lower discs 502-508 to be rotated in their respective directions to accommodate such upward movement. Note that because the front and rear discs on each side of the baler are intermeshed via their driving teeth 514, all of the lower discs rotate in unison when one of them is caused to rotate by the growing bale. Such rotation of the lower discs may be hydraulically resisted by a special hydraulic circuit controlled by a relief valve similar to that provided in connection with the first two embodiments, if such is desired; or, reliance may be had on the inherent resistance of hydraulic flow in a close-loop manner during such time, as will hereinafter be described with respect to the circuit illustrated in FIG. 36.

Figure 39:
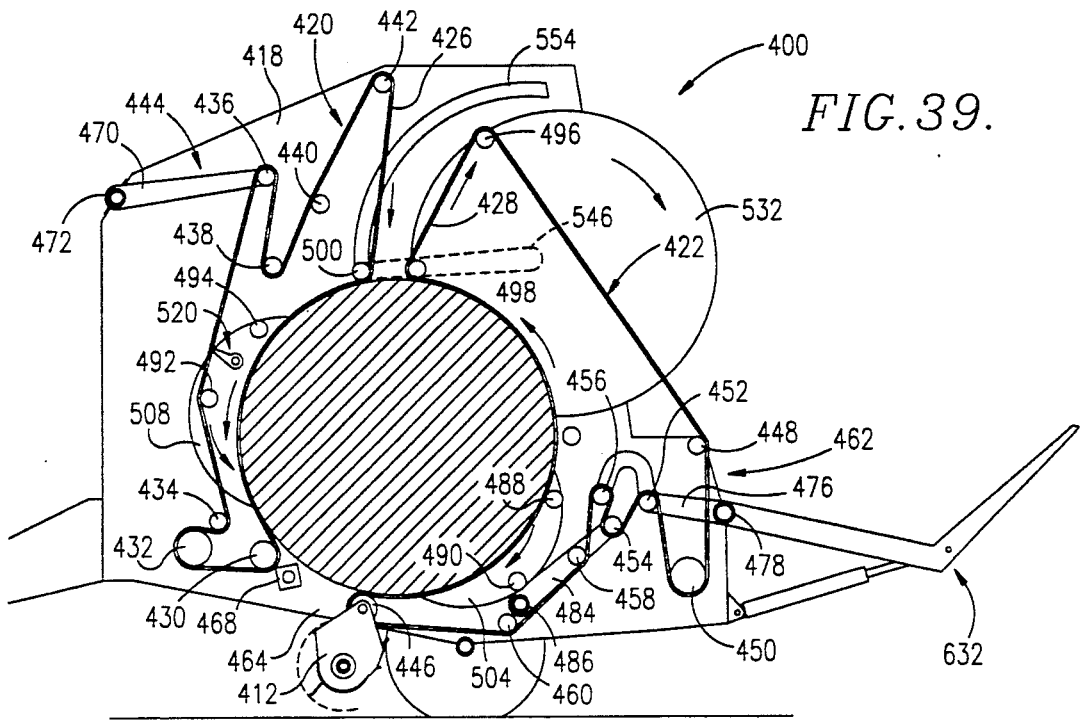

The bale keeps growing within the chamber 466 and causing the lower discs to rotate back out of the way until it reaches full size, as illustrated in FIG. 39. During this formation period, the bale has been resting on the lower rollers 430 and 446 at the bottom of the chamber 466, as well as the starting roller 468. By the time the bale reaches full size, as shown in FIG. 39, it has grown so much that the two upper positioning rollers 500 and 498 have been encountered and upward force has been directed against those rollers to move them upwardly as well, although the primary movement of these two rollers has been by the rear roller 498. The lower discs with their rollers 494 and 488 have by this time been rotated back to virtually ineffective positions, but the bale continues to be enveloped by the belt stretches 426 and 428 by virtue of the presence of the rollers 500 and 498.

Figure 40:
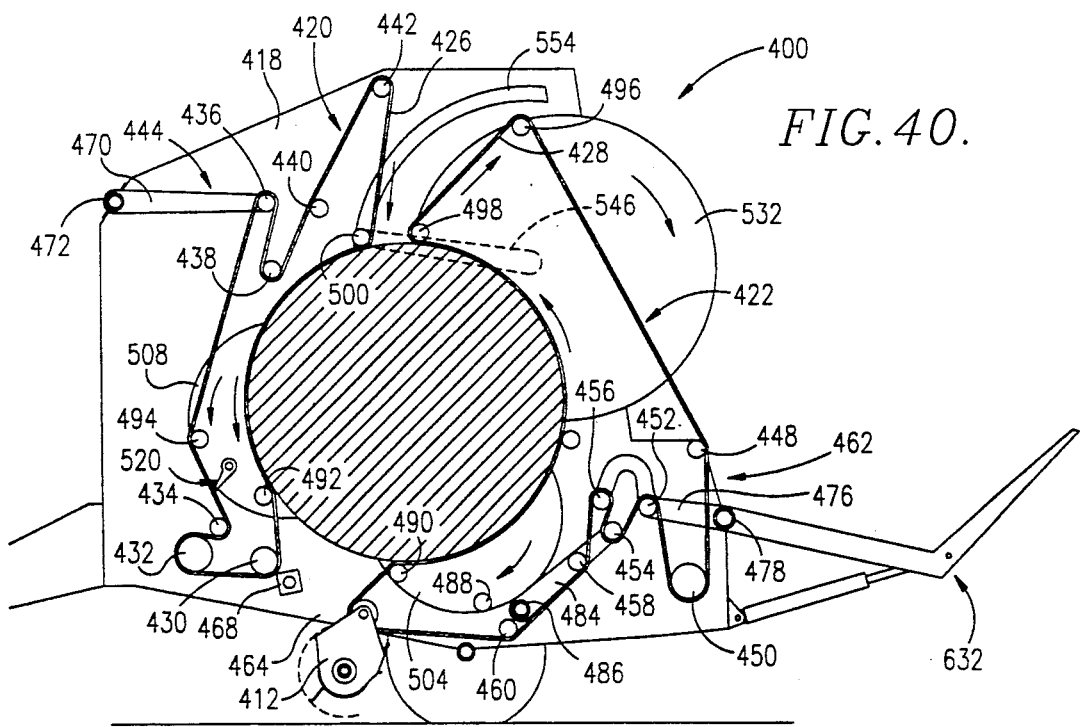

Up to this time in forming the bale, none of the positioning rollers have been powered. Their changes of position have resulted from being forced by the growing bale to move out of their home positions. However, when the bale reaches full size, the machine enters the lifting mode, causing the lower discs 502-508 to be hydraulically power driven on around to rotate the positioning rollers 492 and 490 into position underneath the bale and to commence exerting a lifting force on the bale as shown in FIG. 40. This causes the finished bale to start moving away from its first location in the lower portion of the baler upwardly toward a second location in the baler, but without actually removing the bale from its forming chamber. The bale remains fully enveloped by the belt stretches 426 and 428 during this lifting sequence and simply moves with its same chamber upwardly in the baler until reaching the second location, as illustrated in FIG. 41.

Figure 41:
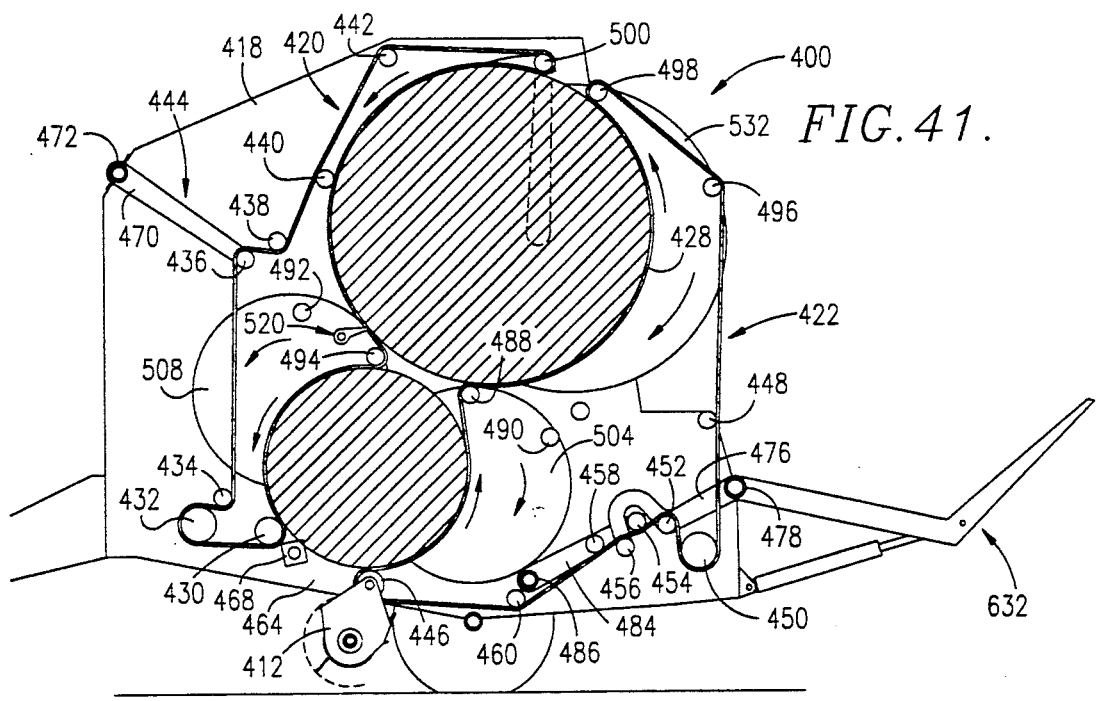
Figure 42:
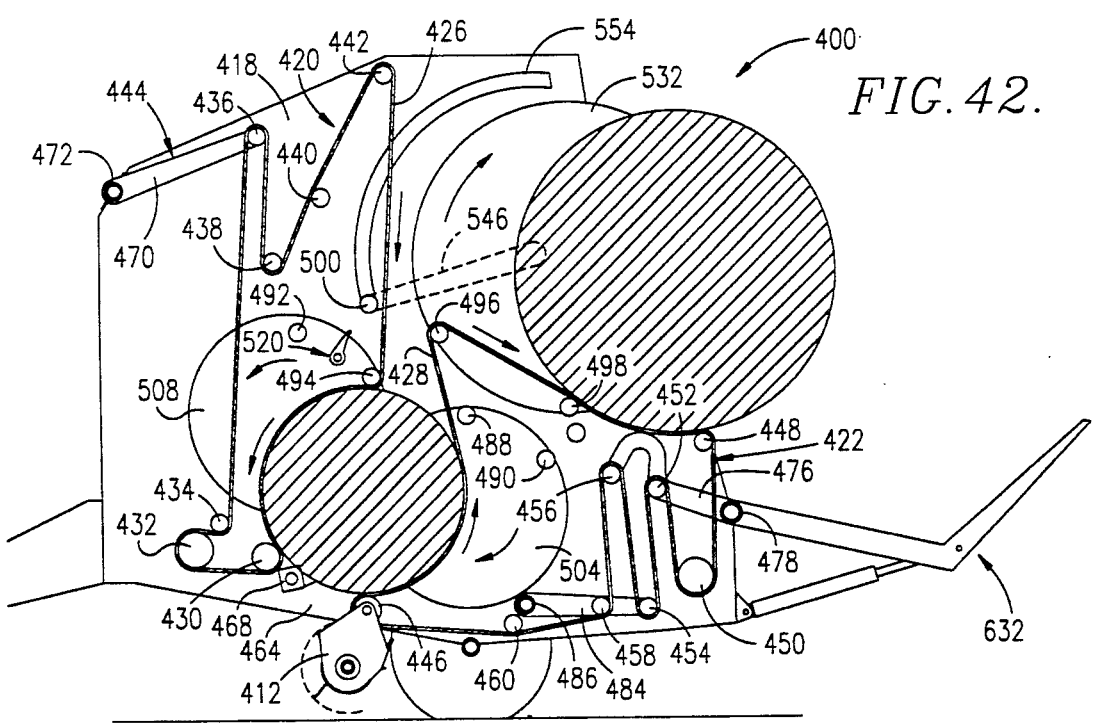

Although FIG. 41 shows a new bale of significant size below the raised previous bale, it is to be understood that prior to the condition of things illustrated in FIG. 41 a new chamber will have been formed below the raised bale by the lower discs 502-508 taking the shape of that illustrated in FIG. 37. This is due to the fact that the discs 502-508 will have completed the final leg of their 360° rotation beyond the position of FIG. 40, bringing the positioning rollers 494 and 488 together once again at the top of the new chamber. Then, with the raised, prior bale still in its FIG. 41 position, the core in the new chamber will begin to grow as shown in FIG. 38 until the condition of things illustrated in FIG. 41 is attained.

During the lifting cycle in which the lower chamber progressively changes configuration between its FIG. 39, FIG. 40 and FIG. 37 shapes, the baler continues to advance and crop material continues to enter the baler beneath the bale as it is being raised. While a small portion of the incoming materials may be added to the bale as it is being lifted, inasmuch as the new chamber is not fully closed off at the top, the added material during this transition period is only a small volume and has no adverse effect upon the finished quality of the bale. Moreover, as the positioning rollers 488-492 approach their home positions, the finger assembly 520 comes into position adjacent the top of the new chamber to close off that area and effectively separate the upwardly flowing hay from the rising bale, causing the stream of material to be diverted back down into the forming chamber and commence preparation of the core for the next bale.

In practice, and as will be explained in more detail hereinafter with respect to the hydraulic circuitry illustrated in FIG. 36, both the lower discs 502-508 and the upper discs 530 and 532 are powered during the lifting cycle so as to avoid the imposition of an untoward load on the hydraulic system as the bale is raised. This is particularly important when it is considered that because the bale remains enveloped by the belt stretches 426 and 428 while it is being lifted, thus keeping the chamber of the baler closed, there is additional resistance to lifting of the bale that would not otherwise be present. If the bale chamber were opened during this time, the lifting force required would be significantly lower; however, compactive control over the lifting bale would be lost at this time, perhaps resulting in a lack of density in the bale and a rough exterior. The actuation of the lower discs 502-508 and the upper discs 530 and 532 is in a sequential manner during the lifting cycle, as will hereinafter be explained in further detail.

As the bale is lifted up to its second location in the baler, which is illustrated at FIG. 41, the upper discs 530 and 532 are powered to their positions of FIG. 41, while the swing arms 544 and 546 are moved to their raised positions partially by the force of the rising bale and partially from mechanical interaction with the discs 530,532. In this latter respect, it will be remembered that lost motion couplings 558 and 560 are provided to cause the swing arms 544 and 546 to be moved upwardly by the discs 530,532 after a certain amount of lost motion of the discs. Thus, as the shoulders 562 on the discs 530,532 come into underlying engagement with the blocks 564 on the swing arms 544 and 546, the swing arms are lifted upwardly with the rotating discs 530,532, assuring that the front belt stretch 426 is wrapped tightly around the front of the bale throughout the lifting process and while the bale remains in its lifted location of FIG. 41. It will be noted, however, that as the discs 530,532 are subsequently rotated beyond their FIG. 41 positions, the lift arms 544 and 546 are released from discs 530,532 as the shoulders 562 slip out from underneath the blocks 564 at the intersecting point 570 of such structure as illustrated in FIG. 31, permitting the swing arms 544,546 to ultimately swing back down to their initial home positions when the bale is finally discharged.

Preferably, as the bale is being raised up to its FIG. 41 location, wrapping of the bale has already commenced so as to minimize the time that is devoted to tying and discharging the bale once it has reached full size. In a preferred embodiment, the twine dispenser 630 may include a pair of swingable dispensing tubes that come together near the transverse center of the baler and then swing progressively further apart from one another in opposite directions along the length of the bale. Once the tubes reach their outboardmost positions, the respective lengths of twine are severed by suitable means at that location.

With the twine tubes positioned in their dispensing attitudes near the center of the baler with twine hanging down from such tubes, the twine ends hang down between the front and rear belt stretches 426,428 and are ultimately engaged by the turning bale as it rises in the baler. The loose ends of the twine thus become gripped between the turning bale and the front web stretches 426, and ultimately wrapped entirely around the bale. As the bale is raised to its FIG. 41 location, the swing arms 544 and 546 engage the twine dispenser 630 and swing the dispenser 630 upwardly along with the roller 500 so that the dispenser 630 stays in a proper position to feed twine to the bale, notwithstanding the change in shape and location of the front and rear belt stretches 426,428 during this process. By then swinging the twine tubes outwardly from their centered positions to pay out the twine along the length of the spinning bale, the bale can be fully wrapped with a number of coils of the twine or other material as may be desired.

Once the tying cycle has been completed, the lifted bale is ready for discharge, by which time the next bale in the new chamber below is approximately two-thirds its final size. The upper discs 530 and 532 are then powered in a clockwise direction, viewing FIG. 41, and without simultaneously powering the lower discs 502-508, causing the positioning rollers 498 and 496 of the upper discs 530,532 to move downwardly and rearwardly from their FIG. 41 positions to their FIG. 42 positions. This effectively opens the chamber of the bale and provides a downwardly and rearwardly inclined ramp effect, allowing the bale to gravitationally discharge completely from the baler or roll down to the accumulating tail gate 632, where the bale is temporarily held pending further discharge. Of course, the twine or wrapper previously applied to the finished bale has been appropriately severed from its source of supply. Since the swing arms 544 and 546 have been released from the discs 530 and 532, they are free to return by gravity to their initial home positions against the stops 556 at this time. Continued rotation of the upper discs 530,532 from their FIG. 42 positions ultimately causes them to return to their home positions of FIG. 37, at which time the powered rotation ceases. They remain in their home positions until such time as the next bale growing therebeneath physically moves them upwardly in the manner of FIG. 39 as the next bale completes the final one-third of its forming cycle and reaches full size. At that point, the next lifting cycle is commenced, and the operation is continued as previously explained, all on a non-stop basis.

DESCRIPTION AND OPERATION OF THE HYDRAULIC CONTROL OF FIG. 36

The hydraulic circuitry includes three directional control valves denoted as 636,638, and 640, respectively. The directional control valve 636 is used to actuate and deactuate the lower disc drive motor 592, the directional control valve 638 is used to actuate and deactuate the upper disc drive motor 600 during movement of the upper discs to their discharge positions, and the directional control valve 640 is utilized to actuate and deactuate a tying cylinder 642 which may be utilized to operate the swingable tubes of the twine dispensing mechanism 630. When the directional control valve 640 is in a deactivated condition as in FIG. 36, the cylinder 642 is held in a retracted state such that the tubes are maintained in their dispensing positions near the center of the baler. However, when the directional control valve 640 is actuated, the tying cylinder 642 is forced to extend and swing the twine tubes toward their outboard, cutoff positions. Once the wrapped bale has been discharged, the twine tubes may return to their centralized, dispensing positions by deenergizing the directional control valve 640 to retract the cylinder 642.

The hydraulic system as illustrated in FIG. 36 has its components shown in their deactivated positions. Thus, as oil is pumped out of reservoir 590 by the pump 588, it is supplied under pressure to all portions of the system, but without actuating the hydraulic motors 592 and 600. A line 644 from the pump 588 continuously supplies oil under pressure to the front and rear tension cylinders 475 and 482.

With the directional control valves 636, 638 and 640 deactivated, oil from the pump 588 flows along line 644, thence through a main supply line 646 to the tying cylinder 642 via the port 648 in valve 640 and a line 650 connecting port 648 with the rod end of the cylinder 642. With the cylinder 642 fully retracted, oil in line 644 passes over the relief pressure and returns to reservoir 540 via a line 652 and relief valve 654.

A line 656 from line 646 to directional control valve 636 is closed at this time because of the position of valve 636; similarly, a line 658 from line 646 to directional control valve 638 is also closed at this time due to the position of directional control valve 638. It will be appreciated that during retraction of the tying cylinder 642, oil is forced from the cylinder end thereof via a discharge line 660 which communicates with a main return line 662 to the reservoir 590 via a port 664 in the directional control valve 640.

When the sequence control processor 608 is signaled by the appropriate upper disposition sensors 610, 612 that it is time to commence powered operation of the lower discs, the control processor 608 actuates the directional control valve 636 to shift the same leftward from its FIG. 36 position. Prior to this time, the lower disc drive motor 592 has been a part of a closed loop circuit consisting of the lines 666 and 668 communicating with each other via a port 670 in directional control valve 636. Thus, although the motor 592 can be rotated slowly by the growing bale as it engages the positioning roller 494 and pushes it upwardly and thence rearwardly to force oil through lines 666 and 668, there is no high pressure oil directed to the motor 592 at this time. A sequence control valve 672 communicating with line 668 via line 674 remains closed at this time due to a higher pressure setting on the valve 672 than that which is experienced in the lines 666, 668 and 674 at this time.

When the directional control valve 636 is shifted leftwardly by control processor 608, high pressure oil in line 656 is communicated with line 668 via the port 676 in directional control valve 636. This causes the drive motor 592 to be pressure-actuated, rotating the lower discs in such directions as to move the positioning rollers 492 and 490 on down and around into their underlying positions with the full size bale. As the motor 592 continues to be operated by high pressure oil, a lifting force is imparted to the bale, tending to raise it in the machine. Such raising continues until the back pressure in the lines 668 and 674 reaches the limit of the sequence control valve 672, whereupon a line 678 is opened by actuating the sequence valve 672 in a manner to align port 680 in valve 672 with the lines 674 and 678. Thus, the drive motor 600 for the upper discs becomes supplied with high pressure oil, causing the upper discs 530,532 to also be driven, raising the upper positioning rollers 500 and 498. During actuation of the upper disc motor 600 through high pressure oil, a discharge line 680 from the motor 600 is communicated with the main return line 662 via a counter-balance valve 682 which responds to the high pressure in line 680 so as to shift and align its internal port 684 with short lines 686 and 688 on opposite inflow and outflow sides of the valve 682. Prior to actuation of the sequence valve 672, the motor 600 has been free to be actuated only by the enlarging bale against a resistance of oil circulating in a closed loop containing the motor 600, such loop also including the line 680, the line 686, the port 684, counter-balance valve 682, the line 688, main retain line 662, short line 690 connecting return line 662 with a port 692 in direction control valve 638, a line 694 leading from port 692, and the line 678 which is communicated with line 694 via a check valve 696 which becomes unseated during such pre-rotation of the motor 600.

As pressurized operation of the upper disc drive motor 600 by high pressure oil causes the upper discs 530 and 532 to rotate, the downward resistance to lifting of the bale is reduced, causing the back pressure in lines 668 and 674 to likewise be reduced. This has the effect of re-closing the sequence valve 672, cutting off pressurized oil to the upper disc drive motor 600 so that only the lower disc drive motor 592 continues operation at that time. When the back pressure once again builds up on lines 668 and 674, the sequence valve 672 is re-opened, once again causing powered operation of the upper disc drive motor 600 to the extent necessary to relieve the force required to lift the finished bale, but without unwrapping the same from its chamber. This alternating sequence continues until the bale is fully raised into its lifted position, such as illustrated in FIG. 41. At that time, the sequence control processor 608 is signaled to deactuate the directional control valve 636, which returns the lower disc drive motor 592 to its idling mode. This terminates lifting of the bale and causes the lower disc drive motor 592 to be operated only by the action of the growing bale in the lower portion of the baler.

By this time the tying cycle will have been initiated, assuming that the bale is to be wrapped, although such is not theoretically absolutely required. With the twine tubes in their centered positions so that the rising bale grips the dangling free ends of the twine as the bale continues to spin, pulling of twine from the twine tubes is sensed by the twine feed sensor 626. This information is received by the sequence control processor 608 which shifts the directional control valve 640 leftwardly to its actuated position. This movement aligns an internal port 698 with the high pressure line 464 and the line 660 such that high pressure oil is introduced into the cylinder end of cylinder 642, causing cylinder 642 to extend and progressively swing the tubes outwardly along the length of the bale toward their cutoff positions. Oil discharged from cylinder 642 during this process leaves via the line 650 which is communicated with the main return line 662 via a port 700. A suitable twine feed indicator 702 may be operably coupled with the control processor 608, if desired, in order to permit the operator to monitor the twine dispensing cycle and terminate such cycle if such should become necessary due to a lack of twine actually being dispensed by the twine dispenser 630. A variety of twine feed indicators are presently available and form no part of the present invention, per se.

Once the tying cycle has been completed and the bale is ready for discharge from its upper location in the baler, the control processor 608 is advised of such condition and sends a signal to the directional control valve 638 which is caused to shift leftwardly from its FIG. 6 position, aligning a port 704 of the valve 638 with the high pressure line 658 and line 694 leading to the upper disc drive motor 600. Consequently, the upper disc drive motor 600 is powered at this time through the remaining portion of its powered operating cycle causing the upper discs 530 and 532 to likewise complete their remaining portion of a 360° operating cycle, The bale is discharged from the baler at this time. When the upper disc drive motor 600 completes its operating cycle, such is noted by the appropriate sensors and the sequence control processor deactivates the directional control valve 638 to likewise deactuate the upper disc drive motor 600.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described merely a preferred or exemplary embodiment thereof.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. In a round baler capable of continuous movement across a field during crop pickup, bale formation and bale discharge operations, the improvement comprising:

a pair of stationary, spaced-apart members;

means for picking up crop material from the ground and feeding the same into the baler through the space between said members;

flexible web means arranged in such a manner as to present a pair of opposed web stretches leading from said members and movable in mutually opposite directions during operation so as to apply compactive and rolling forces to crop material confined between the web stretches; and positioning mechanism for the web means including two groups of positioning rollers on opposite sides of the opposed web stretches and means for shifting the rollers of the two groups in mutually opposite rotative directions along separate, endless loops of travel disposed to bring and temporarily maintain successive rollers from one group into close proximity with corresponding, successive rollers from the other group along a common course of travel in which portions of the two loops are proximal to one another, the rollers of each successive pair of rollers moving along said common course of travel being disposed on opposite sides of the web stretches therebetween and to define the closed discharge end of a baling chamber whose open, entrance end is defined by the stationary members, said baling chamber progressively enlarging as the paired rollers move away from the stationary members from one end of the common course of travel toward the opposite end of the common course of travel, each successive pair of rollers being operable as they approach one another adjacent said one end of the common course of travel to close the entrance end of the baling chamber after completion of a finished bale and to form the discharge end of a next succeeding baling chamber, each pair of rollers during their subsequent movement along said common course of travel being operable to progressively move a formed bale in its chamber away from said stationary members as a new bale forms in the next succeeding baling chamber and to eject the formed bale from the baler as the immediately preceding pair of rollers move away from one another at said opposite end of the common course of travel to open the discharge end of the baling chamber.

2. In a round baler as claimed in claim 1; and
means for wrapping the formed bale with wrapping material while the formed bale remains in its baling chamber during formation of the next succeeding bale in the next succeeding baling chamber.

3. In a round baler as claimed in claim 2,
said shifting means being operable to dispose rollers of one of the groups thereof in a manner to present, in cooperation with a portion of said web means, an inclined discharge ramp for the wrapped bale following wrapping and discharge thereof from its baling chamber.

4. In a round baler as claimed in claim 1,
said shifting means being operable to dispose rollers of one of the groups thereof in a manner to present, in cooperation with a portion of said web means, an inclined discharge ramp for the formed bale following discharge thereof from its baling chamber.

5. In a round baler as claimed in claim 1,
said opposed web stretches and said common course of travel being disposed in a generally upright disposition whereby a formed bale is lifted by a pair of cooperating rollers into an elevated position as the rollers move away from the stationary members toward the opposite end of the common course of travel.

6. In a round baler as claimed in claim 5, and
means for wrapping the formed bale while it is disposed in said elevated position.

7. In a round baler as claimed in claim 6,
said shifting means for the positioning rollers being operable to yieldably resist upward movement of the pair of rollers closing the upper, discharge end of the baling chamber during the initial stages of bale forming in the chamber, to then move the pair of rollers upwardly along the common course of travel away from the bale forming in the chamber to forcibly eject the previously formed bale up and out of the baler, and to then return the pair of rollers back down against the forming bale to thereafter yieldably resist upward movement.

8. In a round baler as claimed in claim 1, and
apparatus cooperable with each pair of rollers adjacent said one end of the common course of travel for assisting in preventing the flow of incoming crop material between the roller and into the preceding baling chamber, said apparatus being temporarily movable across the discharge end of the baling chamber in a direction transverse to the flow of material tending to move toward the preceding baling chamber for separating such material flow from material in the preceding chamber and deflecting the same back into the baling chamber.

9. In a round baler as claimed in claim 6,
said opposed web stretches including a front web stretch and a rear web stretch with respect to the normal direction of travel of the baler, said front web stretch extending upwardly beyond the rear web stretch when positioning rollers are in position for discharge of a formed and wrapped bale, whereby to encourage gravitational discharge of the formed and wrapped bale down a ramp presented by the rear web stretch.

10. In a round baler as claimed in claim 1,
each of said web means comprising a series of individual, endless flexible belts positioned in side-by-side relationship across the width of the baler.

11. In a continuous round baler, the improvement comprising:
a pair of opposite side walls supported for movement across a field and disposed in laterally spaced apart relationship with respect to the normal direction of travel of the baler;
web means disposed within the space between said side walls;
a series of transverse rollers spanning the distance between said side walls and engaging the web means in a manner to present a pair of opposed stretches of which at least one is generally upright and between which bale forming may occur when the stretches are driven in mutually opposite directions;
power means for driving said web means in a manner to move said stretches in mutually opposite directions;
means for picking up crop materials from a field as the baler is moved across the same and for introducing such materials into the entrance of a baling chamber formed between said stretches at a lower termination of the stretches;
said series of rollers having slack take-up means and web tensioning means associate therewith for yieldably permitting said chamber to enlarge as a bale progressively forms therein and deflects the stretches laterally and upwardly in order to accommodate the increasing size of the bale,
said series of rollers including pair of cooperating, front and rear positioning rollers successively movable into positioning engagement with said stretches and adapted for travel while confining said stretches therebetween in a generally upward direction along a predetermined course of travel beginning at a lower portion of the baler and terminating at an upper portion of the baler,
each pair of said positioning rollers during travel thereof along said course of travel comprising the top extremity of said baling chamber as the latter progressively increases in size during bale formation;
control mechanism operably coupled with said positioning rollers for successively presenting said cooperating pairs thereof to said course of travel adjacent the lower portion of the baler and for controlling each cooperating pair during its travel along the course of travel to the upper portion of the baler,
said mechanism being operable as each cooperating pair of positioning rollers is presented to the lower end of said course of travel and then moved a short distance upwardly along the same to cause the cooperating pair of positioning rollers to lift a formed bale while still in its baling chamber upwardly along the course of travel to a raised position for wrapping and subsequent discharge above a new baling chamber, the top of which is formed beneath the raised bale by the cooperating pair of positioning rollers,
said pickup and crop material introducing means being operable to continuously present picked up materials to the web stretches throughout non-stop movement of the baler across the field and continuous, successive, bale-forming cycles,
said control mechanism including a front, continuous loop, flexible drive element and a rear continuous loop, flexible drive element adjacent each of said side walls respectively,
said positioning rollers including a first set of three spaced rollers connecting at opposite ends thereof to the front elements and a second set of three correspondingly spaced rollers connected at opposite ends thereof to the rear elements,
the positioning rollers being disposed on the elements at such locations and the elements being so timed relative to one another that by driving the elements lengthwise during a bale-forming cycle, the positioning rollers of the front elements and the positioning rollers of the rear elements are successively brought together to present said cooperating pairs of positioning rollers along said course of travel; and
wrapping apparatus for applying a binding wrapper to each raised bale before the same is discharged from the baler.

12. In a continuous round baler as claimed in claim 11,
said wrapping apparatus being operable to commence applying the wrapper to the bale before the bale is raised, to continue application of the wrapper during raising of the bale, and to complete application of the wrapper after the bale has been raised.

13. In a continuous round baler as claimed in claim 11,
the rollers of each cooperating pair of positioning rollers separating adjacent the upper end of the course of travel in respective generally fore-and-aft directions to release the raised bale from confinement by the web stretches and permit the released bale to gravitationally discharge from the baler.

14. In a continuous round baler as claimed in claim 11,
apparatus temporarily movable across said course of travel immediately following lifting of a bale to its raised position for separating in flowing material from the raised bale and confining such material to the new baling chamber formed beneath the raised bale.

15. In a continuous round baler as claimed in claim 11,
said control mechanism further including a drive for said elements operable to supply lifting power to the cooperating pair of positioning rollers along said course of travel as a bale is raised and to supply yieldable retarding force to the cooperating pair of rollers along said course of travel after a bale has been raised and while a next bale is forming in said baling chamber.

16. In a continuous round baler as claimed in claim 15,
said driving including a rotary hydraulic motor having an output coupled with said elements, said motor having hydraulic circuit means coupled therewith for drivingly rotating the output of the motor when lifting power to said cooperating pair of positioning rollers is required and for resisting fluid is displacement by the output of the motor when retarding force to the cooperating pair of rollers is required.

17. In a continuous round baler as claimed in claim 11,
said webs including endless belts arranged in side-by-side relationship across the baler.

18. In a continuous round baling method, the steps of:
picking up crop materials from a field and introducing the materials into a baling chamber at a first location as the chamber advances across the field;
forming the picked-up materials into a round bale within the chamber while the advancement continues and until the formed bale reaches full size;
shifting the full-size bale and its chamber to a new location, while continuously maintaining the full-size bale confined in its chamber and without opening the chamber to discharge the bale, and carrying the bale within its chamber at the new location while a new chamber is formed at the first location which continues to receive picked up materials and to form a new bale;
wrapping the bale at the new location with a binding material while the next successive bale is forming in the new baling chamber from crop materials continuing to be introduced into the chamber; and
discharging the wrapped bale from its chamber when the wrapping step has been completed and without stopping advancement of the chambers across the field, pickup and introduction of crop materials into the new baling chamber, or formation of the next successive bale in the new baling chamber.

19. In a continuous round baling method as claimed in claim 18,
each full-size bale and its chamber being shifted upwardly from the first location during said shifting step, and said new location being located above the first location.

20. In a continuous baling method as claimed in claim 19,
said discharging step including discharging the wrapped bale gravitationally from said new location without rendering the new baling chamber inoperable for continuing to form the next successive bale.

21. In a continuous baling method as claimed in claim 20,
said discharging step further including forming a gravitational discharge ramp leading downwardly from said new location.

22. In a continuous baling method as claimed in claim 18,
said forming of the bale taking place between opposed, oppositely moving stretches of flexible webs which are spaced apart adjacent the lower extremities thereof to define a bottom entrance to the baling chamber and are converged together to define the top of the baling chamber, said discharging of the finished bale including the step of separating the stretches adjacent the top of the chamber after the bale has been wrapped and raising the wrapped bale up through the separated stretches.

23. In a continuous baling method as claimed in claim 22,
the step of the raising the wrapped bale up through the separated stretches during discharging of the bale being carried out by supporting the wrapped bale with the top of the baling chamber which is below the wrapped bale and raising the top of the lower baling chamber sufficiently to force the wrapped bale out of the baler; and the additional step of bringing the top of the lower baler back down into compacting engagement with the bale forming in the lower baling chamber following discharge of the wrapped bale.

24. In a continuous baling method as claimed in claim 18,
said forming of the bale taking place between opposed, oppositely moving stretches of flexible webs, at least one of which is disposed in a substantially upright orientation at the beginning of each bale formation.

25. In a continuous round baler, the improvement comprising:
means for defining a baling chamber at a first location within the baler as the baler moves across a field having crop materials lying thereon;
means disposed for continuously lifting crop materials off the field and for feeding the lifted materials into the chamber at said first location,
said chamber defining means including means for forming the picked up materials into a round bale at said first location while the baler continues moving across the field and until the forming bale reaches full size;
means for shifting the full size bale and its chamber to a new location within the baler adjacent said first location and while the full size bale remains confined within its chamber,
said shifting means being operable to effect shifting of the full size bale and its chamber to said new location without opening the chamber to release the bale;
means for defining a new chamber at said first location for receiving picked up materials and forming a new bale while the immediately preceding bale is confined in its chamber during shifting to and disposition at said second location;
means for retaining the shifted bale within its chamber at said second location for at least a portion of the time that the new bale is forming at said first location; and
means for opening the chamber of the shifted bale after the new bale is at least partially formed for discharging the shifted bale from the baler without stopping movement of the baler across the field.

26. In a continuous round baler as claimed in claim 25,
said means for defining chambers at said first and second locations within the baler including a pair of opposed, flexible web stretches movable in opposite directions during operation and operable to yieldably deflect to the extent necessary to accommodate the bales enveloped by the web stretches,
said web stretches having a plurality of movable positioning rollers engageable with the web stretches at certain selected positions along the length of the stretches throughout each bale forming cycle to cooperate in forming the bale chambers, in shifting the bales between the first and second locations thereof, and in discharging the bales from the baler.

27. In a continuous round baler as claimed in claim 26, said positioning rollers being arranged in two separate groups on opposite sides of the web stretches, said two groups of rollers being provided with means for shifting the same along separate, endless loops of travel disposed to bring and temporarily maintain successive rollers from one group into close proximity with corresponding, successive rollers from the other group along a common, longitudinal course of travel in which portions of the two loops of travel are proximal to one another, each successive pair of rollers being operable as they approach one another adjacent one end of the common course of travel to close an entrance end of the baling chamber after completion of a finished bale and to form a discharge end of said new chamber, each successive pair of rollers further being operable during their movement along said common course of travel to progressively move the finished bale in its chamber from said first location in the baler to said second location in the baler as a new bale forms in the new baling chamber.

28. In a continuous round baler as claimed in claim 26, said positioning rollers including two sets of rollers at said first location in the baler on opposite sides of the web stretches mounted for movement in opposite directions along respective, circular paths of travel, each set of rollers including a pair of rollers disposed to move into temporary, close proximity with corresponding rollers of the other set for closing an entrance end of the baling chamber after completion of a finished bale and lifting the finished bale to the second location in the baler, said positioning rollers further including additional rollers at said second location in the baler movable in paths of travel separate and independent from said circular paths of travel for continuing to envelope the finished bale with the web stretches while the bale is in said second location in the baler and until discharge therefrom.

29. In a continuous round baler as claimed in claim 28, said additional rollers including a pair of additional rollers mounted for movement in a circular path of travel on one side of the web stretches and above the first-mentioned circular paths of travel for the two sets of rollers, said pair of additional rollers being operable to maintain the bale chamber of the shifted bale closed during movement from said first location to said second location in the baler, and being further operable to subsequently open the bale chamber of the shifted bale for discharge as the pair of additional rollers moves about its circular path of travel, said additional rollers further including a single roller positioned on the opposite side of said web stretches from said pair of additional rollers, said single roller being mounted for swinging movement in an arc disposed to permit the single roller to engage one of the web stretches and assist in confining the finished bale as it shifts from the first location to the second location in the baler and is temporarily confined and retained at said second location.

30. In a continuous round baler as claimed in claim 29, said positioning rollers being provided with sensor means responsive to the movements of the positioning rollers for controlling operation thereof.

31. In a continuous round baler, the improvement comprising:

a pair of opposite sides disposed in laterally spaced relationship to one another with respect to the path of travel of the baler;

a front set of flexible web means and a rear set of flexible web means supported between said sides, said front and rear sets of web means presenting a pair of generally upright, flexible web stretches disposed in mutually opposed relationship and movable in opposite linear directions for applying compactive and rolling forces to crop material confined between the web stretches;

means adjacent lower ends of said web stretches for maintaining the stretches sufficiently spaced apart in a fore-and-aft direction as to define an entrance to the space between the two stretches;

means for picking up crop materials from the ground as the baler moves across a field and for feeding the picked up materials into said entrance;

a pair of rotatable, front and rear supports on each of said sides respectively;

a pair of front positioning rollers mounted on said front supports and spanning the distance between the two sides, said front positioning rollers being disposed on the front side of said opposed web stretches;

a pair of rear positioning rollers mounted on said rear supports and spanning the distance between the two sides, said rear positioning rollers being disposed on the rear side of said opposed web stretches;

a pair of upper, rear supports rotatably mounted on opposite sides above the rear supports;

a pair of upper, rear positioning rollers mounted on said upper, rear supports and spanning the distance between the two sides, said upper, rear positioning rollers being disposed on the rear side of said opposed web stretches;

a pair of arms swingably mounted on said sides above the lower rotatable supports;

an upper, front positioning roller mounted on said arms and spanning the distance between the two sides, said upper front positioning roller being disposed on the front side of said opposed web stretches; and means for driving said rotatable supports in such directions and at such times during operation of the baler as to present a lower, progressively expandable bale-forming chamber in which a bale is completely formed before then being lifted upwardly to a second location within the baler and temporarily retained at said second location before discharge from the baler, a new bale-forming chamber being defined below the lifted bale while the lifted bale is being raised to the second location and temporarily retained before discharge.

* * * * *